(12) United States Patent
Filter et al.

(10) Patent No.: US 11,431,683 B2
(45) Date of Patent: Aug. 30, 2022

(54) SECURE AND TRUSTED DATA COMMUNICATION SYSTEM

(71) Applicant: Flexa Network Inc., New York, NY (US)

(72) Inventors: Trevor Filter, New York, NY (US); Zachary Kilgore, Brooklyn, NY (US); Tyler Robert Spalding, New York, NY (US)

(73) Assignee: Flexa Network Inc., New York, NY (US)

( * ) Notice: Subject to any disclaimer, the term of this patent is extended or adjusted under 35 U.S.C. 154(b) by 304 days.

(21) Appl. No.: 16/376,911

(22) Filed: Apr. 5, 2019

(65) Prior Publication Data

US 2019/0356638 A1 Nov. 21, 2019

Related U.S. Application Data

(60) Provisional application No. 62/672,652, filed on May 17, 2018.

(51) Int. Cl.

| | |
|---|---|
| *G06Q 20/00* | (2012.01) |
| *H04L 9/40* | (2022.01) |
| *G06Q 20/06* | (2012.01) |
| *G06Q 20/38* | (2012.01) |
| *H04W 12/12* | (2021.01) |
| *H04W 12/033* | (2021.01) |

(52) U.S. Cl.
CPC ....... *H04L 63/0428* (2013.01); *G06Q 20/065* (2013.01); *G06Q 20/3829* (2013.01); *H04W 12/033* (2021.01); *H04W 12/12* (2013.01); *G06Q 2220/00* (2013.01)

(58) Field of Classification Search
CPC ........... G06Q 2220/00; G06Q 2220/10; G06Q 2220/16
USPC .......................... 705/16, 21, 59; 380/44, 262
See application file for complete search history.

(56) References Cited

U.S. PATENT DOCUMENTS

| | | | |
|---|---|---|---|
| 10,055,715 B1 * | 8/2018 | Grassadonia | ...... G06Q 20/4012 |
| 10,540,639 B2 | 1/2020 | Brock | |

* cited by examiner

*Primary Examiner* — Dante Ravetti
(74) *Attorney, Agent, or Firm* — Garlick & Markison; Timothy W. Markison; Patricia M. Healy

(57) ABSTRACT

A method includes storing, by a secure data conveyance device, a certified data object for a user computing device. The method further includes receiving a request from the user computing device that at least a portion of the certified data object be conveyed to a target computing entity. When authenticated, the method further includes data translating the at least a portion from a first data representation into a universal data representation, sending the universal data representation to a trusted data securing device, and data translating the universal data representation into a specific data representation. The method further includes sending the specific data representation to the secure data conveyance device, where the secure data conveyance device adds an expiration time frame and forwards it to user computing device. The method further includes conveying, by the user computing device, the specific data representation with the expiration time frame to target computing entity.

14 Claims, 19 Drawing Sheets

FIG. 1 secure & trusted data communication system 10 secure & trusted data communication system 10 secure & trusted data communication system 10

SECURE AND TRUSTED DATA COMMUNICATION SYSTEM

CROSS-REFERENCE TO RELATED APPLICATIONS

The present U.S. Utility Patent Application claims priority pursuant to 35 U.S.C. § 119(e) to U.S. Provisional Application No. 62/672,652, entitled "OPEN CRYPTOCURRENCY ACCEPTANCE NETWORK AND MOBILE APPLICATION FOR SPENDING CRYPTOCURRENCY," filed May 17, 2018, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to data communication systems and more particularly to secure and trusted communication of a certified data object.

Description of Related Art

Secure data communication involves transfer of data over a channel in a secure manner, which typically involves data encryption. For example, public key infrastructure (PKI) is an encryption method and cybersecurity protocol that secures communications between a server and a client by using two different cryptographic keys (e.g., a public key and a private key); the public key to encrypt and the private key to decrypt. PKI is frequently used for sending large files between organizations and for exchanging secure emails. As long as the private key is only possessed by authorized users, then the authorized users are only ones that can decrypt the data. Thus, no matter who receives the encrypted data, without the private key, it is extremely difficult to recover the data.

Security protocols such as Transmission Control Protocol (TCP), Internet Protocol (IP), Hyper Text Transfer Protocol Secure (HTTPS), Post Office Protocol 3 (POP3), and Internet Message Access Protocol (IMAP) are communication protocols that establish secure communications between computing devices and involve encryption. For instance, TCP is used by two commuting devices to exchange data therebetween. The TCP protocol guarantees delivery of data between the computing devices and also guarantees that packets will be delivered in the same order in which they were sent.

Hardware and software implemented secure transmission protocols are used by many infrastructures (e.g., banks) to detect and prevent unauthorized data access. For example, data loss prevention software uses deep content analysis and central policies to identify, monitor, and protect data within a system. As another example, anti-virus or anti-malware software disarms and removes malicious software from computing devices.

Cloud computing solutions allow for secure online file sharing. For example, one online cloud storage system uses 256-bit Advanced Encryption Standard (AES) for files at rest and Secure Sockets Layer (SSL)/Transport Layer Security (TLS) to protect data in transit between user device apps and the servers. SSL/TLS creates a secure tunnel protected by 128-bit or higher Advanced Encryption Standard (AES) encryption and user device applications and infrastructures are regularly tested for security vulnerabilities. The system also requires a login authentication and public files are only viewable by those who have a link to the files. Extensions of such applications allow for authenticated digital signatures and secure management and storage of important files requiring agreement (e.g., contracts).

Close proximity file sharing applications using Bluetooth allow for secure file sharing by creating a peer-to-peer Wi-Fi network between in-range devices where each device creates a firewall around the connection and encrypted files are exchanged. However, detecting in-range devices via a Wi-Fi connection can present some security issues. For instance, if detecting all in range devices, any devices within range can request to send a file and/or attempt to install malware on the initiating device. Further, if the file sharing application is always enabled, the initiating device may inadvertently share data.

The ease of online data exchange presents copyright infringement and internet piracy concerns. For example, copied or illegally downloaded material can be shared via many different platforms (e.g., peer-to-peer file sharing, email, etc.). To combat piracy, cloud based streaming services negotiate licensing to provide content and enforce access control to avoid copyright infringement. For example, data is kept in "the cloud" and is accessed via an internet connection and a subscription. Such services have reduced piracy by providing free and legal content to consumers. However, stream ripping software can allow any user to turn a file being played on any streaming platform into a file that can be saved and duplicated.

Another data exchange security issue is fraud and identity theft. Fraud and identify theft are particularly concerning in financial applications. One issue is that a typical payment card transaction with a merchant involves several steps (e.g., card authorization, clearing, and settlement) and the participation of various entities. Each step and each entity has its own varying security problems.

The steps involved are also inconvenient, time consuming, and result in additional fees. For example, card authorization (e.g., credit or debit card authorization) begins with the cardholder presenting the card to a merchant for goods or service. The merchant uses a credit card machine, software, or gateway to transmit transaction data to their acquiring bank (or its processor). The acquiring bank routes the transaction data to a card-processing network and the card-processing network sends the transaction data to the cardholder's issuing bank. The issuing bank validates that the card has not been reported stolen or lost, confirms whether funds are available, and sends a response code back through the card-processing network to the acquiring bank as to whether the transaction is approved.

The transaction data typically includes the card number, transaction amount, date, merchant's name, merchant's location, merchant category code, and an encrypted personal identification number (PIN) if entered. The response code reaches the merchant's terminal and is stored in a file until it is settled. The merchant sends the stored, approved transactions to its acquiring back (e.g., at the end of the day) and the acquiring bank reconciles and transmits approved transactions through the appropriate card-processing network. The acquiring bank deposits funds from sales into the merchant's account. The card-processing network debits the issuing bank account and credits the acquiring bank account for the amount of the transaction.

Mobile wallet applications allow cardholders to store card data on a computing device via a digital wallet for convenient transactions. For example, some mobile wallet apps use near field communication (NFC) for contactless payments (e.g., exchange of data by holding device over a payment reader). NFC chips are specifically designed to manage financial security and only store data needed to initiate and complete a transaction. Mobile wallets use types of tokenization to assign a device account number (DAN) in place of an account or card number so that the DAN is passed to the merchant rather than the actual account/card number. As another security measure, digital wallets rely on digital certificates to verify identity. However, using a digital wallet on a device means data passes through not only the device's hardware and operating system but then also a specific payment app, and then finally the source of payment. Further, user fraud (e.g., double spending, etc.) via mobile wallets is possible.

Thus, digital payment instruments consist of complicated financial settlement processes where merchants have to pay processing fees for purchases and involve several different entities (each a discrete point of failure) to process a single exchange. Meanwhile, fraud losses continue to reach all-time highs. Hackers are able to crack merchant systems and other card data holders to access large volumes of card data. Further, fraud such as the use of fake or stolen credit cards and gift cards remains prevalent.

Blockchain technology reduces the risk of fraudulent activity and has a wide range of applications (e.g., secure payment, record keeping, payment systems, management, monitoring, etc.). A blockchain is an immutable ledger for recording transactions within a network, consisting of a continuously growing list of blocks (i.e., groups of transactions) that are securely linked, continually reconciled, and shared among all network participants. Transactions are validated and added to blocks via hashing algorithms, and then permanently written to the chain via consensus of the entire network. Once recorded on the blockchain, transactions cannot be altered.

The first distributed blockchain was conceptualized in 2008 and implemented as a core component of a worldwide cryptocurrency and digital payment system in 2009 where it serves as the public transaction ledger. The digital payment system is designed to transmit cryptocurrency via pseudo-anonymous transactions that are open and public (i.e., anyone can join and view any transaction that has ever happened on the network). To minimize fraudulent activity and deter malicious network activity, the digital payment system implements "proof of work" secure hashing algorithms (SHA-256) that require significant computing power. Since the release of the initial cryptocurrency Bitcoin, over 4,000 alternative variations of cryptocurrencies have been created.

BRIEF DESCRIPTION OF THE SEVERAL VIEWS OF THE DRAWING(S)

DETAILED DESCRIPTION OF THE INVENTION

Figure 1:
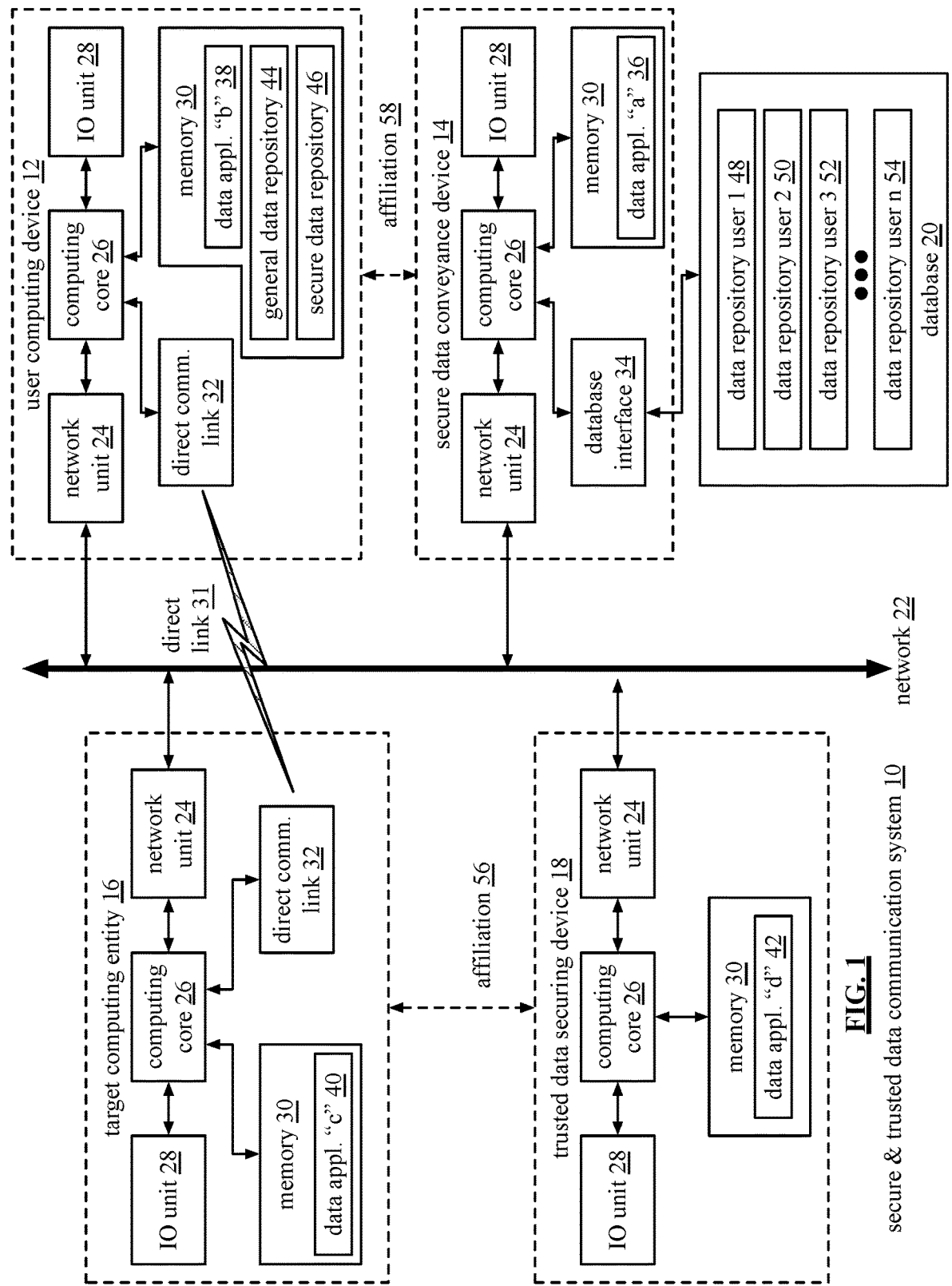
FIG. 1 is a schematic block diagram of an embodiment of a secure & trusted data communication system in accordance with the present invention.

FIG. 1 is a schematic block diagram of an embodiment of a secure & trusted data communication system 10 that includes user computing device 12, secure data conveyance device 14, target computing entity 16, trusted data securing device 18, and database 20. User computing device 12, secure data conveyance device 14, target computing entity 16, and trusted data securing device 18 may be portable computing devices and/or a fixed computing devices. A portable computing device may be a social networking device, a gaming device, a cell phone, a smart phone, a digital assistant, a digital music player, a digital video player, a laptop computer, a handheld computer, a tablet, a video game controller, a portable merchant point-of-sale (POS) device (e.g., a mobile device with POS capabilities) and/or any other portable device that includes a computing core 24. A fixed computing device may be a computer (PC), a computer server, a cable set-top box, a satellite receiver, a television set, a printer, a fax machine, home entertainment equipment, a video game console, a fixed merchant point-of-sale (POS) device (e.g., cash register), and/or any type of home or office computing equipment.

The network 22 includes one or more local area networks (LAN) and/or one or more wide area networks (WAN), which may be a public network and/or a private network. A LAN may be a wireless-LAN (e.g., Wi-Fi access point, Bluetooth, ZigBee, etc.) and/or a wired LAN (e.g., Firewire, Ethernet, etc.). A WAN may be a wired and/or wireless WAN. For example, a LAN is a personal home or business's wireless network and a WAN is the Internet, cellular telephone infrastructure, and/or satellite communication infrastructure.

Each of the user computing device 12, secure data conveyance device 14, target computing entity 16, and trusted data securing device 18 includes a network unit 24, computing core 26, input/output (10) unit 28, and memory 30. Each network unit 24 includes software and hardware to support one or more communication links via the network 22 directly and/or indirectly. For example, network unit 24 of computing device 12 supports a network 22 communication link between computing device 12 and devices 14-18. Computing cores 26 includes one or more of: one or more processing modules, one or more main memories (e.g., RAM), a core control module, a video graphics processing module, an IO control module, and a peripheral interface control module.

IO units 28 enable connections between devices 12-18 and user inputs/peripheral devices. Unit inputs/peripheral devices include one or more of an external hard drive, headset, a keypad, a keyboard, control switches, a touchpad, a speaker, a microphone, a thumb drive, a camera, etc.

Memories 30 includes one or more of main memory (RAM), hard drives, solid-state memory chips, one or more other large capacity storage devices, and/or cache memory. Memories 30 store operational instructions for computing cores 26. For example, user device 12 memory 30 stores data application "b" 38, secure data conveyance device 14 memory 30 stores data application "a" 36, target computing entity 16 memory 30 stores data application "c" 40, and trusted data securing device 18 memory 30 stores data application "d" 42. User device 12 memory 30 further stores general data repository 44, and secure data repository 46. The various applications stored by the devices support secure & trusted data communication within the system as described herein.

Database 20 includes data repositories for users 1-n 48-54. Database 20 is a special type of computing device that is optimized for large scale data storage and retrieval. Database 20 includes similar components to that of the devices 12-18 with more hard drive memory (e.g., solid state, hard drives, etc.) and potentially with more processing modules and/or main memory. Further, database 20 is typically accessed remotely; as such it does not generally include user input devices and/or user output devices. In addition, an embodiment of database 20 is a standalone separate computing device and/or may be a cloud computing device. Secure data conveyance device 14 and database 20 are secure devices implementing high level security protocols to prevent unauthorized use, hacking, etc. For example, database 20 is a holding company (e.g., a cryptocurrency holding company) separate from secure data conveyance device 14 that has been specially licensed to store sensitive materials and has insurance policies to protect against theft and fraud.

User computing device 12 is associated with a user (e.g., user 1) and has an affiliation 58 with secure data conveyance device 14. For example, affiliation 58 is a user account. Secure data conveyance device 14 includes database interface 34 that enables a connection between secure data conveyance device and database 20. User computing device 12 and target computing entity 16 include a direct communication unit 32 that allows for a direct communication between them. For example, direct communication unit 32 includes technology to establish a direct link 31 between user computing device 12 and target computing entity 16 via video, infrared (IR), near-field communication (NFC), etc.

Target computing entity 16 includes one or more computing devices of the secure and trusted data communication system having an affiliation with a specific target identifier (ID). For example, a target may be a merchant having a specific target ID and the target computing entity 16 is a point of sale (POS) device in a retail store associated with the merchant. The secure & trusted data communication system 10 supports secure, trusted, fraud-reduced data communication between a user computing device 12 and the target computing entity 16.

In an example of operation, user computing device 12 sets up a user account (e.g., affiliation 58) with secure data conveyance device 14 for the secure and trusted storage of certified data objects. A certified data object is a data object that has been certified as being accurate and authentic via a certification method (e.g., distributed ledger technology (e.g., a blockchain, block directed acyclic graphs (block-DAG), transaction-based directed acyclic graphs (TDAG), etc.), digital signature, digital certificate, etc.). The certified data object is in a first data representation and has a meaning. For example, a certified data object is cryptocurrency in a first data representation having a meaning of value. As another example, the certified data object is a video file in a first representation (e.g., an encrypted, uncompressed video file) having a meaning of video and audio content. As another example, the certified data object is an audio file in a first representation (e.g., an encrypted, uncompressed audio file) having a meaning of audio content. As another example, the certified data object is a text file (e.g., business records, copyrighted works, financial records, etc.) in a first representation (e.g., an encrypted text file) having a meaning of text content.

User computing device 12 initiates user account set-up (or other means of establishing affiliation 58) with secure data conveyance device 14 and downloads data application "b" 38. The application "b" includes instructions for certified data object management, storage (e.g., management of general data repository 44 and secure data repository 46, etc.), and conveyance.

Secure data conveyance device 14 memory 30 stores data application "a" which has instructions for certified data object, management, conveyance, and storage via database 20 (e.g., data repository creation and management, etc.). For example, upon user computing device 12 user account set up, secure data conveyance device 14 generates one or more data repositories associated with user computing device 12 in database 20. For example, secure data conveyance device 14 generates data repository user 1 48 in database 20 for secure storage of user computing device 12's certified data object(s).

Secure data conveyance device 14 securely stores certified data object(s) on behalf of user computing device 12 so that user computing device 12 maintains a representation of the certified data object(s) but does not store the certified data object itself. For example, user computing device 12 has a certified data object stored in its general data repository 44 of memory 30. User computing device 12 sets up a user account with secure data conveyance device 14 and sends at least a portion of the certified data object to secure data conveyance device 14 using a secure one-way transmission (e.g., distributed ledger technology (DLT) (e.g., a blockchain, block directed acyclic graphs (blockDAG), transaction-based directed acyclic graphs (TDAG), etc.)) for secure storage). A secure one-way transmission is a transmission that cannot be undone and/or tampered with.

For example, distributed ledger technology (DLT), such as a blockchain, is an immutable ledger for recording transactions within a network, consisting of a continuously growing list of blocks (i.e., groups of transactions) that are securely linked, continually reconciled, and shared among all network participants. Transactions are validated and added to blocks via hashing algorithms, and then permanently written to the chain via consensus of the entire network. Once recorded on the blockchain, transactions cannot be altered and are thus secure one-way transmissions. A more detailed discussion of blockchain data storage is discussed with reference to FIG. 7.

Secure data conveyance device 14 verifies certification of the certified data object and when verified, adds the certified data object to user computing device 12's data repository. For example, a blockchain is used to add the certified data object to user computing device 12's data repository and the certified data object is secured via one or more techniques (e.g. encryption, proprietary network, certificates, digital signature, etc.). Secure data conveyance device 14 stores the certified data object or portion thereof (hereinafter for FIG. 1 referred to as the certified data object), in user computing device 12's data repository (e.g., data repository user 1 48).

Secure data conveyance device 14 creates a ghost image of the stored certified data object and sends the ghost image to user computing device 12 for storage within user computing device 12's secure data repository 46. Because a blockchain is implemented, the transfer of certified data object to secure data conveyance device 14 is public and secure. After a blockchain is used to store certified data objects for user computing device 12, some to all of the rest of the conveyance may be "off-chain" in some instances and "on-chain" for other instances. As an example, when the certified data object is cryptocurrency, some to all of the rest of the conveyance is "off-chain" and not made public. A more detailed discussion of user account set up is discussed with reference to FIGS. 5 and 6. A more detailed discussion of blockchain data transmissions and certification is discussed with reference to FIG. 7.

After user account setup and secure storage of certified data objects with secure data conveyance device 14, user computing device 12 is ready to securely convey certified data objects to a target computing entity 16. For example, user computing device 12 is a buyer, a certified data object is cryptocurrency, and the target computing entity 16 is a merchant (e.g., a merchant corporation, store, point of sale (POS) device, etc.). As another example, user computing device 12 is a seller, a certified data object is copyrighted material (e.g., music), and target computing entity 16 is a buyer. As another example, user computing device 12 is one party in a business transaction, a certified data object is a confidential document (e.g., contract, financial information, etc.), and target computing entity 16 is another party in the business transaction. Target computing entity's 16 memory 30 stores data application "c", which includes instructions for securely receiving certified data objects (e.g., creation of one-time use codes, history of transactions, etc.).

To begin a conveyance, user computing device 12 establishes a direct communication link 31 with the target computing entity 16 via the direct communication units 32. For example, each direct communication unit 32 includes near field communication (NFC) chips and when user computing device 12 is within range of target computing entity 16, user computing device 12 can open a channel or tab to exchange data with target computing entity 16. User computing device 12 sends target computing entity 16 a request to initiate conveyance of at least a portion of a certified object to the target computing entity via the direct communication link 31.

The initiation of the conveyance may be done in a variety of ways. For example, the request to initiate conveyance may be in the form of a split bar code, where user computing device 12 maintains one portion of a bar code and target computing entity 16 maintains another portion of a bar code such that when they are aligned in close proximity, the conveyance is initiated. Having a correct piece of a barcode on user computing device 12 as well as the act of alignment, demonstrates intent to enter into a transaction (i.e., user authorization). As another example, the request is a secure handshake protocol between the computing devices 12 and 16.

When the request to initiate conveyance is approved by the target computing entity 16 (e.g., via a split bar code example), the user computing device 12 receives a one-time use code from the target computing entity 16 regarding conveyance of the certified data object. The one-time use code is one or more of: a unique number, an alpha numeric, a function, and/or any item that uniquely connects the parties in the transaction to the particular transaction. For example, the target computing entity 16 approves the request to initiate conveyance when the target computing entity 16 has the appropriate affiliation 56 with trusted data securing device 18 (e.g., an account), is otherwise capable of receiving the conveyance, user computing device 12 is a trusted computing device (e.g., by verification of ID, certificate, etc.), etc.

User computing device 12 sends the one-time use code plus a request to convey the certified data object to secure data conveyance device 14. Convey means sending a copy of the certified data object or transferring the certified data object. When the request is authenticated, secure data conveyance device 14 data translates the certified data object from a first data representation to a universal data representation while substantially preserving the meaning of the certified data object. For example, when the certified data object is cryptocurrency, the first data representation is a specific type of cryptocurrency (e.g. Bitcoin) and the universal data representation is fiat currency (e.g., US dollars) or a general cryptocurrency used within the system 10. As another example, when the certified data object is a confidential text file, the first data representation is an encrypted text file and the universal data representation is a portable document format (PDF) file.

To send the universal data representation of the certified data object to trusted data securing device 18, secure data conveyance device 14 initiates a handshake with trusted data securing device 18. For example, secure data conveyance device 14 requests destination information from the trusted data securing device 18 and secure data conveyance device 14 validates the destination information. When the destination information is valid, the secure data conveyance device establishes communication with the trusted data securing device 18 utilizing a secure communication technique. A secure communication technique includes one or more of: encrypted communication, communication over a proprietary network, a handshake protocol, and use of digital signatures and/or certificates. Secure data conveyance device 14 sends the universal data representation of the certified data object to trusted data securing device 18 utilizing the secure communication technique.

Trusted data securing device 18 has an affiliation 56 with target computing entity 16. For example, target computing entity 16 has an account with trusted data securing device

18. Trusted data securing device 18 stores data application "d" 42, which includes instructions for creating specific representations of certified data objects in accordance with identity of the target computing device 16. Specific data representations of certified data objects substantially preserve their meaning, expire in a short period of time if not properly received by the target computing entity 16, and are only usable by the target computing entity 16.

Trusted securing device 18 data translates the universal data representation of the certified data object into a specific data representation. For example, when the certified data object is cryptocurrency, the first data representation is a specific type of cryptocurrency (e.g., Bitcoin), the universal data representation is fiat currency (US dollars), and the specific data representation is a stored value account (SVA) usable by the target computing entity 16 (e.g., a merchant). As another example, when the certified data object is a confidential text file, the first data representation is an encrypted text file, the universal data representation is a PDF file, and the specific data representation is in a format specific to the target computing entity 16 (e.g., Word document, pages, etc.). The specific representation also includes a conveyance identifier (ID) to identify a key for decrypting the text file and includes the transaction ID (e.g., the one-time-use code), which was created during the initial set-up of the conveyance of the certified data object. A more detailed discussion of data translation is discussed with reference to FIGS. 11A-11E.

To send the specific data representation back to the secure data conveyance device 14, trusted data securing device 18 initiates a handshake with secure data conveyance device 14. For example, trusted data securing device 18 requests destination information from secure data conveyance device 14 and trusted data securing device 18 validates the destination information. When the destination information is valid, the trusted data securing device 18 establishes communication with the secure data conveyance device 14 utilizing a secure communication technique. Trusted data securing device 18 sends the specific data representation to secure data conveyance device 14 utilizing the secure communication technique.

Secure data conveyance device 14 adds an expiration time frame to the specific data representation. As such, the specific data representation can only be conveyed to the target computing entity 16 within a certain period of time (e.g., a few seconds, 30 seconds, one minute, or more). To send the specific data representation with the expiration time frame to user computing device 12, secure data conveyance device 14 initiates a handshake with user computing device 12. For example, secure data conveyance device 14 requests destination information from user computing device 12 and secure data conveyance device 14 validates the destination information. When the destination information is valid, the secure data conveyance device 14 establishes communication with the user computing device 12 utilizing a secure communication technique.

Secure data conveyance device 14 sends the specific representation with the expiration time frame, code (e.g., transaction ID, which corresponds to the one-time-use code), and the target computing entity identifier (ID) to user computing device 12 utilizing the secure, communication technique. User computing device 12 sends the specific representation with the expiration time frame, the code, and the target computing entity identifier (ID) to target computing entity 16 via the direct communication link 32. The target computing entity 16 verifies the code and ID and completes the conveyance if verified. Once complete, target computing entity 16 sends user computing device 12 a receipt of the conveyance with a code. User computing device 12 then sends a confirmation (e.g., success, failure, time-out) of the conveyance to secure data conveyance device 14 where secure data conveyance device 14 ends the transaction. A more detailed discussion of certified data object conveyance is discussed with reference to FIGS. 8A-9B. A more detailed discussion of ending the certified data object conveyance transaction is discussed with reference to FIGS. 12-13.

Figure 2:
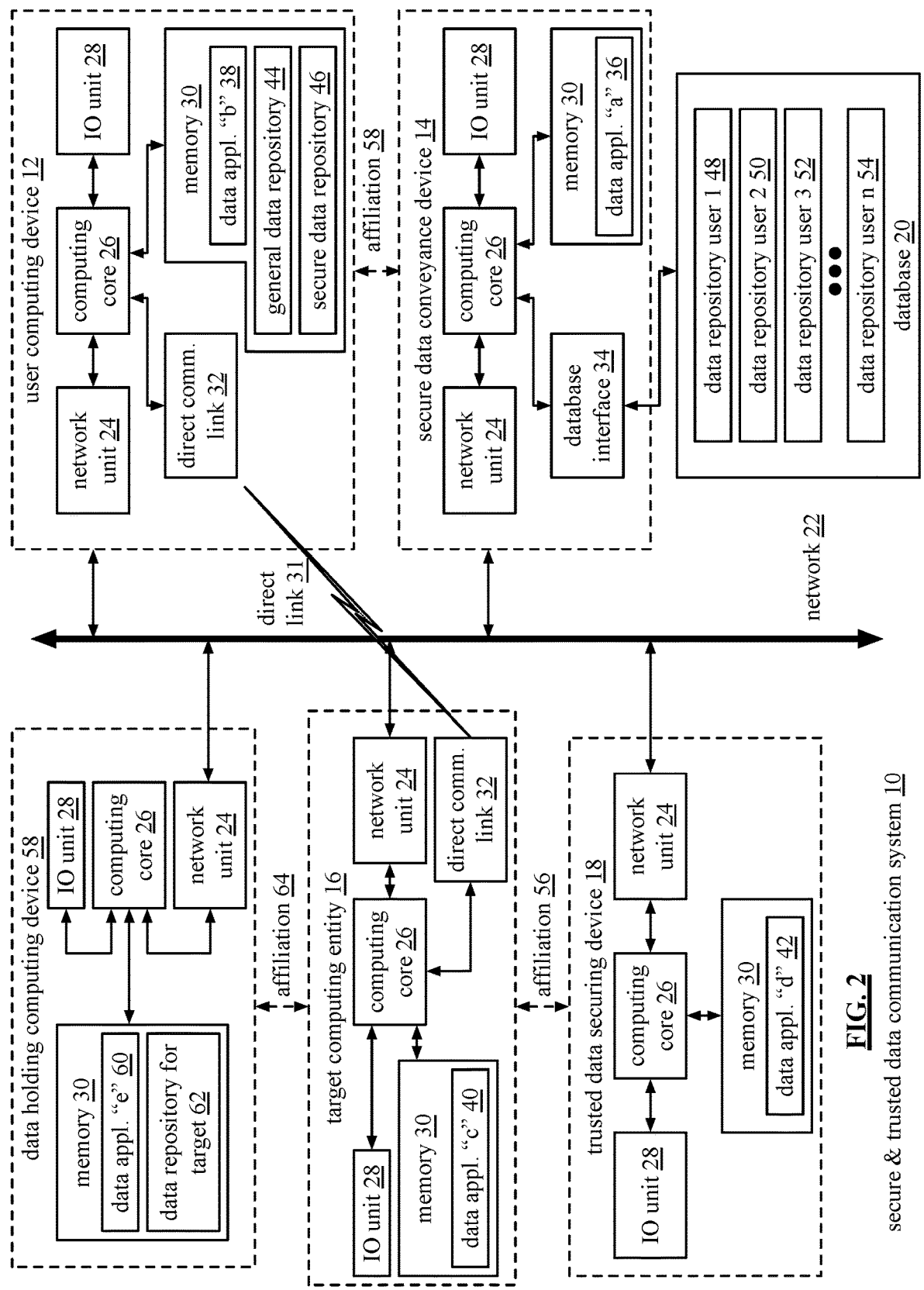
FIG. 2 is a schematic block diagram of another embodiment of the secure & trusted data communication system in accordance with the present invention.

FIG. 2 is a schematic block diagram of another embodiment of the secure & trusted data communication system 10 that includes user computing device 12, secure data conveyance device 14, target computing entity 16, trusted data securing device 18, database 20, and data holding computing device 58. The secure & trusted data communication system 10 of FIG. 2 operates similarly to FIG. 1 except for the addition of data holding computing device 58. Data holding computing device 58 includes IO unit 28, computing core 26, network unit 24, and memory 30 which each operate similarly to those discussed with reference to FIG. 1. Network unit 24 establishes a network 22 connection between data holding computing device and devices 12-18.

Data holding computing device 58 has an affiliation 64 with target computing entity 16. For example, target computing entity 16 has an account with data holding computing device 58. Data holding computing device 58 memory 30 stores data application "e" 60. Data application "e" 60 operational instructions include instructions on creating and maintaining trusted specific representations of certified data objects to be used by target computing entity 16. Specific representations of certified data objects are created and stored prior to a conveyance initiated by user computing device 12 in the data repository for target 62 of memory 30. Specific data representations substantially preserve the meaning the certified data objects and are only usable by the target computing entity 16.

For example, target computing entity 16 is a merchant and data holding computing device 58 is a stored value account (SVA) processor and/or distributor. Data holding computing device 58 stores SVAs in data repository for target 62 for use by target computing entity 16. As another example, target computing entity 16 is a receiver (e.g., end user) of copyrighted content and data holding computing device 58 is an intermediary (e.g., store, broker, distributor, licensee, etc.) between the content provider (user computing device 12) and the target computing entity 16.

In an example of operation, user computing device 12 initiates conveyance of a certified data object via direct communication link 32 with target computing entity 16 as discussed with reference to FIG. 1. Secure data conveyance device 14 receives a request to convey at least a portion of a certified data object (hereinafter for FIG. 2 referred to as "certified data object") with a one-time use code from the target computing entity 16 and data translates the at least a portion of the certified data object from a first representation to a universal representation. For example, secure data conveyance device 14 translates a specific type of cryptocurrency to fiat currency. As another example, secure data conveyance device 14 translates an encrypted uncompressed audio file into an uncompressed audio file.

Secure data conveyance device 14 sends the universal representation of the certified data object with a request for a specific representation of the certified data object, the target computing entity's identifier (ID), and the one-time use code to the data holding computing device 58. To send the universal data representation of the at least a portion of the certified data object to the data holding device 58, secure data conveyance device 14 initiates a handshake as discussed with reference to FIG. 1 and sends the universal data representation of the certified data object to data holding device 58 via a secure communication technique. Data holding device 58 has a specific representation of the certified data object stored in data repository for target 62 and sends the specific representation to secure data conveyance device 14 (e.g., via the secure communication technique).

Secure data conveyance device 14 adds an expiration time frame to the specific data representation and sends the specific representation with the expiration time frame, a code, and the target computing entity identifier (ID) to user computing device 12. To send the specific data representation with the expiration time frame to user computing device 12, secure data conveyance device 14 initiates a handshake with user computing device 12. For example, secure data conveyance device 14 requests destination information from user computing device 12 and secure data conveyance device 14 validates the destination information. When the destination information is valid, the secure data conveyance device 14 establishes communication with the user computing device 12 utilizing a secure communication technique.

User computing device 12 sends the specific representation with the expiration time frame, code, and the target computing entity identifier (ID) to target computing entity 16 via the direct communication link 32. The target computing entity 16 verifies the code and ID and completes the conveyance if verified. Once complete, target computing entity 16 sends user computing device 12 a receipt of the conveyance with a code. User computing device 12 then sends a confirmation (e.g., success, failure, time-out) of the conveyance to secure data conveyance device 14 where secure data conveyance device 14 ends the transaction. Secure data conveyance device 14 sends close conveyance information to data holding computing device 58 to update the data repository for target 62. A more detailed discussion of certified data object conveyance transaction with the data holding computing device 58 is discussed with reference to FIG. 10. A more detailed discussion of ending the certified data object conveyance transaction is discussed with reference to FIGS. 12-13.

Figure 3:
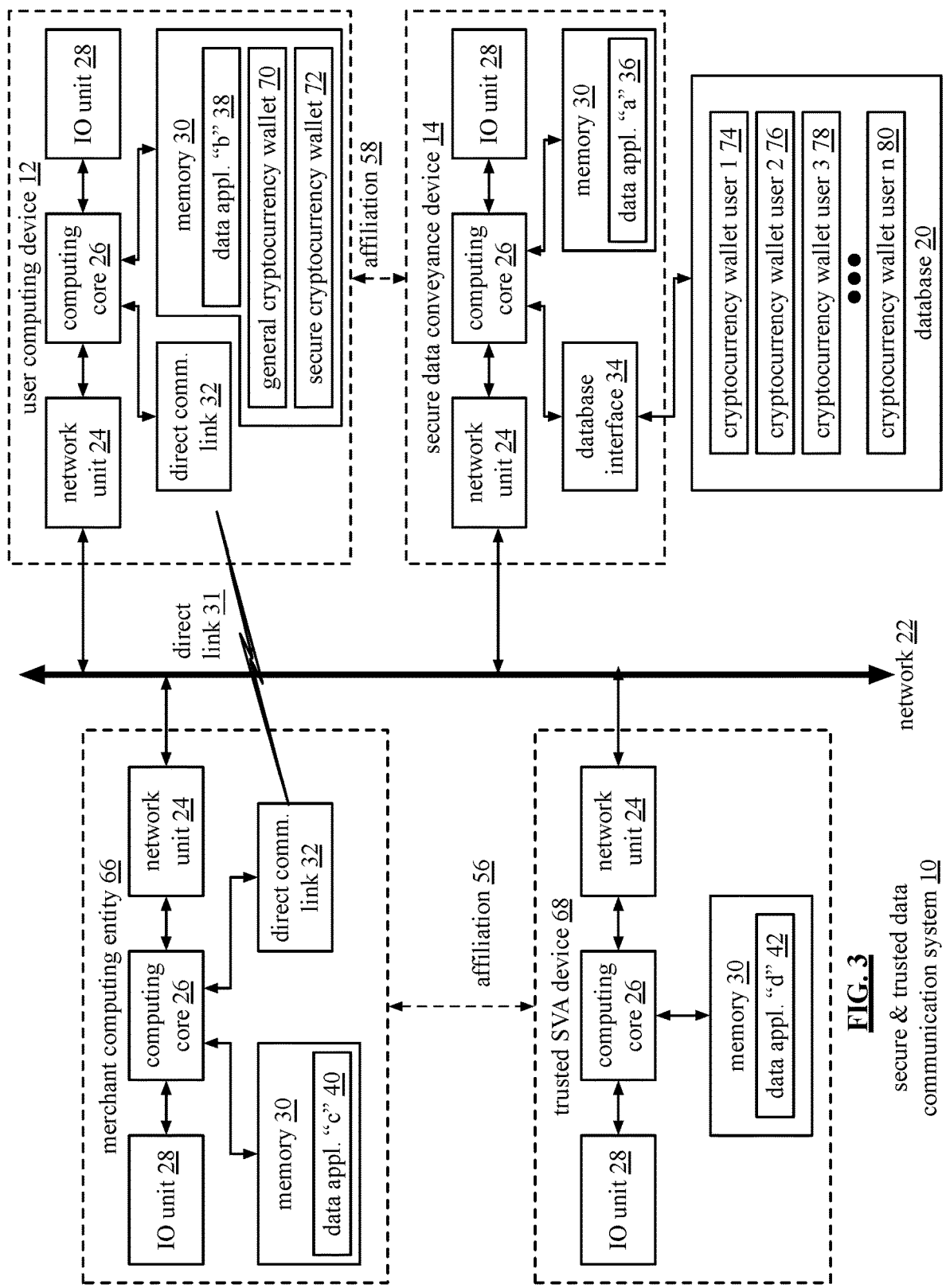
FIG. 3 is a schematic block diagram of another embodiment of the secure & trusted data communication system in accordance with the present invention.

FIG. 3 is a schematic block diagram of another embodiment of the secure & trusted data communication system 10 that includes user computing device 12, secure data conveyance device 14, merchant computing entity 66, trusted stored value account (SVA) device 68, and database 20. FIG. 3 operates similarly to FIG. 1 except that FIG. 3 illustrates a specific example where a certified data object is cryptocurrency, target computing entity 16 is a merchant computing entity 66, and trusted data securing device 18 is a trusted SVA device 68.

Cryptocurrency is a digital payment system based on distributed ledger technology (e.g., blockchain) where pseudo-anonymous transactions are open and public (i.e., anyone can join and view any transaction that has ever happened on the network). To minimize fraudulent activity and deter malicious network activity, the digital payment system implements "proof of work" secure hashing algorithms (SHA-256) that require significant computing power. While cryptocurrencies are primarily blockchain based, other distributed ledger technologies may be used. For example, Hashgraph uses an asynchronous consensus algorithm to enable a network of nodes to communicate with each other and reach consensus in a decentralized manner. It does not need miners to validate transactions and uses directed acyclic graphs for time-sequencing transactions without bundling them into blocks.

Despite the anti-fraud benefits of cryptocurrencies, the value of cryptocurrency can be volatile (sometimes fluctuating dramatically over the course of a single day) and merchants are reluctant to invest in expensive point-of-sale and security upgrades to accommodate cryptocurrency payments. Further, many cryptocurrency payments are public for anyone to see. Customers may not wish to have their purchases made public and merchants may not wish to have consumer data made public for competitors. Yet merchants need to know who is purchasing goods from them and how often (e.g., for tax and legal reasons). As such, merchants have yet to widely accept cryptocurrency payments despite their potential benefits and consumers must primarily rely on present-day payment instruments. Some companies have developed digital wallets and apps that enable retail blockchain payments, but they are universally dependent on existing payment networks.

In the example of FIG. 3, the issues above are addressed. In an example of operation, user computing device 12 sets up a user account (e.g., affiliation 58) with secure data conveyance device 14 for the secure and trusted storage of cryptocurrency. Cryptocurrency is initially in a specific cryptocurrency format (e.g., Bitcoin).

User computing device 12 initiates user account set-up (or other means of establishing affiliation 58) and downloads data application "b" 38 which includes instructions for cryptocurrency management, storage (e.g., management of general cryptocurrency wallet 70 and secure cryptocurrency wallet 72, etc.), and conveyance. Secure data conveyance device 14 memory 30 stores data application "a", which has instructions for cryptocurrency management, conveyance, and storage via database 20 (e.g., user cryptocurrency wallet creation and management, etc.). For example, upon user computing device 12 user account set up, secure data conveyance device 14 generates one or more cryptocurrency wallets associated with user computing device 12 in database 20. For example, secure data conveyance device 14 generates cryptocurrency wallet user 1 74 in database 20 for secure storage of user computing device 12's cryptocurrency.

Secure data conveyance device 14 securely stores cryptocurrency on behalf of user computing device 12 so that user computing device 12 maintains a representation of the cryptocurrency (e.g., a ghost image) but does not store the cryptocurrency itself. For example, user computing device 12 has cryptocurrency stored in its general cryptocurrency wallet 70 of memory 30. User computing device 12 sets up a user account with secure data conveyance device 14 and sends at least a portion of the cryptocurrency (hereinafter for FIG. 3 referred to as transferred cryptocurrency) to secure data conveyance device 14 using a secure one-way transmission (e.g., a blockchain) for secure storage.

Secure data conveyance device 14 verifies certification of the transferred cryptocurrency and when verified, adds the transferred cryptocurrency to user computing device 12's cryptocurrency wallet (e.g., cryptocurrency wallet user 1 74) in database 20. For example, database 20 is a custodial wallet (e.g., a cryptocurrency holding company) separate from secure data conveyance device 14 that has been specially licensed to store sensitive materials and has insurance policies to protect against theft and fraud. A blockchain may be used to add the transferred cryptocurrency to user computing device 12's cryptocurrency wallet 74 and the transferred cryptocurrency is securely stored. After a blockchain is used to store cryptocurrency for user computing device 12, the rest of the conveyance is considered "off-chain." Therefore, conveyance information is not made public.

Secure data conveyance device 14 creates a ghost image of the transferred cryptocurrency and sends the ghost image to user computing device 12 for storage within user computing device 12's secure cryptocurrency wallet 72. A more detailed discussion of account set up is discussed with reference to FIG. 6. After user account setup and secure storage of cryptocurrency with secure data conveyance device 14, user computing device 12 is ready to securely convey cryptocurrency to merchant computing entity 66 in exchange for goods and/or services. Merchant computing entity 66 stores data application "c" in memory 30, which includes instructions for securely receiving cryptocurrency payments even if the merchant computing entity 66 would not normally receive cryptocurrency as a form of payment.

To begin a conveyance, user computing device 12 establishes a direct communication link with the merchant computing entity 66 via direct communication link 32. User computing device 12 sends merchant computing entity 66 a request to initiate purchase of a product or service and payment using cryptocurrency.

When the request to initiate purchase is approved by the merchant computing entity 66, the user computing device 12 receives a one-time use code (i.e., transaction ID) from the merchant computing entity 66. For example, the merchant computing entity 66 approves the request when the merchant computing entity 66 is affiliated with trusted SVA device 68 and is otherwise capable of receiving the conveyance, user computing device 12 is a trusted computing device (e.g., by verification of ID, certificate, etc.), etc.

User computing device 12 sends the one-time use code plus an amount regarding the requested purchase to secure data conveyance device 14. When approved, secure data conveyance device 14 removes an amount of cryptocurrency to cover the purchase and translates the amount of cryptocurrency from specific cryptocurrency to fiat currency (e.g., digital representation of US dollars), and sends the fiat currency to trusted SVA device 68. To send the fiat currency to trusted SVA device 68, secure data conveyance device 14 initiates a handshake with trusted SVA device 68. For example, secure data conveyance device 14 requests destination information from the trusted SVA device 68 and secure data conveyance device 14 validates the destination information. When the destination information is valid, the secure data conveyance device establishes communication with the trusted SVA device 68 utilizing a secure communication technique.

Trusted SVA device 68 has an affiliation 56 with merchant computing entity 66. For example, merchant computing entity 66 has an account with trusted SVA device 68. Trusted data SVA device 68 stores data application "d" 42, which includes instructions for creating SVAs. Trusted SVA device 68 translates the fiat currency to an SVA that is only valid for this particular transaction and for this merchant and sends the SVA to secure data conveyance device 14. To send the SVA back to the secure data conveyance device 14, trusted SVA device 68 initiates a handshake with secure data conveyance device 14. For example, trusted SVA device 68 requests destination information from secure data conveyance device 14 and trusted SVA device 68 validates the destination information. When the destination information is valid, the trusted SVA device 68 establishes communication with the secure data conveyance device 14 utilizing a secure communication technique. Trusted SVA device 68 sends the SVA to secure data conveyance device 14 utilizing the secure communication technique. A more detailed discussion of data translation is discussed with reference to FIG. 11B.

Secure data conveyance device 14 adds an expiration time frame to SVA and sends the SVA with the expiration time frame, a code, and the merchant computing entity identifier (ID) to user computing device 12. To send the SVA with the expiration time frame to user computing device 12, secure data conveyance device 14 initiates a handshake with user computing device 12. For example, secure data conveyance device 14 requests destination information from user computing device 12 and secure data conveyance device 14 validates the destination information. When the destination information is valid, the secure data conveyance device 14 establishes communication with the user computing device 12 utilizing a secure communication technique. Secure data conveyance device 14 sends the SVA with the expiration time frame, code (e.g., conveyance ID), and the merchant computing entity identifier (ID) to user computing device 12 utilizing the secure communication technique.

As such, the SVA is only transferable to the merchant computing entity 66 for a short time period (e.g., 30 seconds to one minute). Further, all the above steps happen very quickly in order to minimize the volatility aspects of cryptocurrency conversion. User computing device 12 sends the SVA with the expiration time frame, a code, and the merchant computing entity identifier (ID) to merchant computing entity 66. The merchant computing entity 66 verifies the code and ID and completes the conveyance if verified. Once complete, user computing device 12 sends a confirmation (e.g., success, failure, time-out) to secure data conveyance device 14 where secure data conveyance device 14 ends the transaction. A more detailed discussion of cryptocurrency conveyance is discussed with reference to FIGS. 9A-9B. A more detailed discussion of ending the cryptocurrency conveyance is discussed with reference to FIG. 13.

Figure 4:
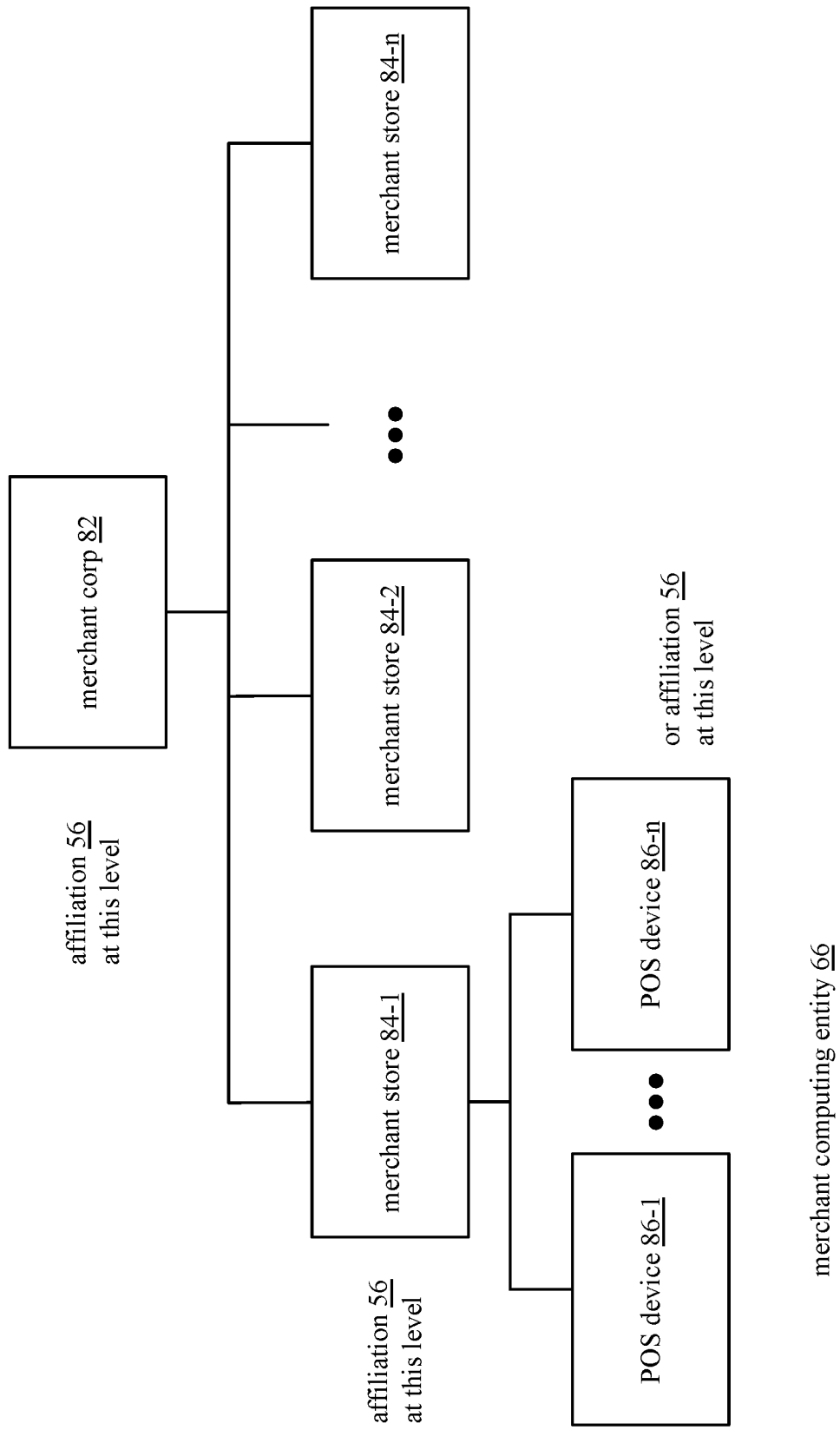
FIG. 4 is a schematic block diagram of an example of merchant computing entity affiliations in accordance with the present invention.

FIG. 4 is a schematic block diagram of an example of merchant computing entity 66 affiliations. At a conveyance level, merchant computing entity 66 is one or more point of sale (POS) devices 86-1 through 86-n. Merchant computing entity 66 may be affiliated with the trusted stored value account (SVA) device 68 (e.g., affiliation 56) at the merchant corporation 82 level, the merchant store 84-1 through 84-n, or at the transaction level/POS device 86-1 through 86-n level.

Figure 5:
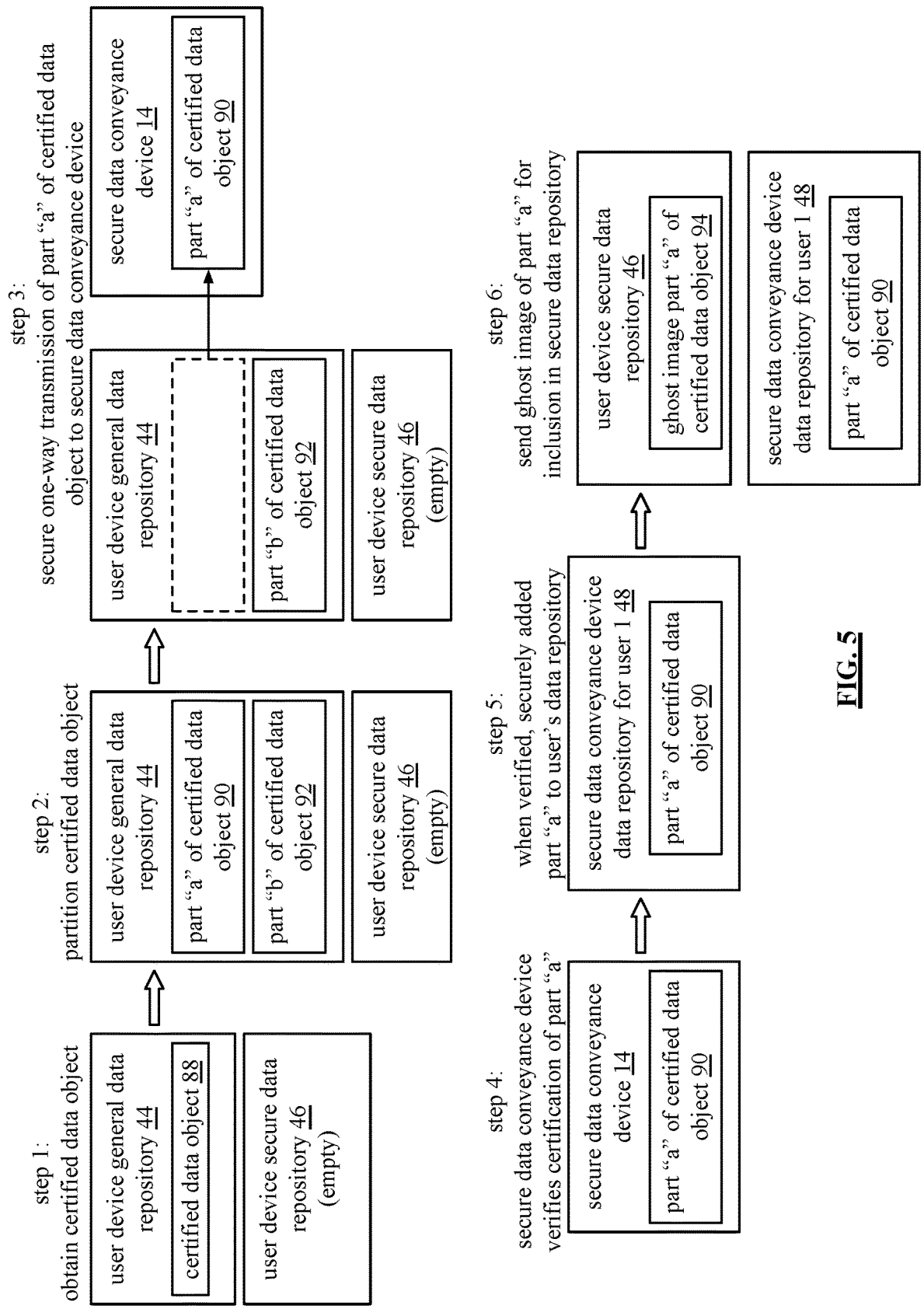
FIG. 5 is a schematic block diagram of an embodiment of user computing device account setup with secure data conveyance device in accordance with the present invention.

FIG. 5 is a schematic block diagram of an embodiment of user computing device setting up an account with secure data conveyance device. Prior to the steps listed, user computing device 12 obtains application "b" 38 and establishes affiliation 58 with secure data conveyance device 14 (e.g., initiates a user account with secure data conveyance device 14). At step 1, user computing device 12 obtains a certified data object 88 where it is stored in user computing device 12's general data repository 44. User computing device 12's secure data repository 46 is currently empty. A data object is one or more of cryptocurrency, copyrighted works, and confidential data (e.g., employee records, financial records, etc.) and is certified via a blockchain. A more detailed discussion of blockchain data storage is discussed with reference to FIG. 7.

At step 2, user computing device 12 partitions the certified data object 88 into parts "a" and "b." Part "a" of certified data object 90 is the amount of the certified data object that is to be conveyed. Part "a" of certified data object 90 may be some or all of the certified data object 88 and part "b" of certified data object 92 will be what's left, if any. For example, if the data object is a book, part "a" may be a chapter of the book. As another example, if the data object is an audio or video file, then part "a" may be a copy of the audio or video file and part "b" is the original audio or video file.

At step 3, user computing device 12 sends part "a" of certified data object 90 to secure data conveyance device 14 via a secure one-way transmission (e.g., using a blockchain).

At step 4, secure data conveyance device 14 verifies certification of part "a" of certified data object 90. When verified, secure data conveyance device 14 securely adds part "a" of certified data object 90 to secure data conveyance device data repository for user 1 48 at step 5. For example, a blockchain is used to add part "a" of certified data object 90 to data repository for user 1 48 and part "a" of certified data object 90 is encrypted using a private key of user computing device 12.

At step 6, secure data conveyance device 14 sends a ghost image of part "a" of certified data object 94 to user computing device 12 for storage in secure data repository 46. As shown, the real data (part "a" of certified data object 90) is stored in secure data conveyance device repository for user 1 48 while a representation of the data (the ghost image of part "a" of certified data object 94) is stored in user computing device 12's secure data repository 46. Therefore, user computing device 12 has an image of what is in secure data conveyance device 14, but does not have possession of it, and cannot undo the transfer (e.g., because transactions are secured on a blockchain).

Figure 6:
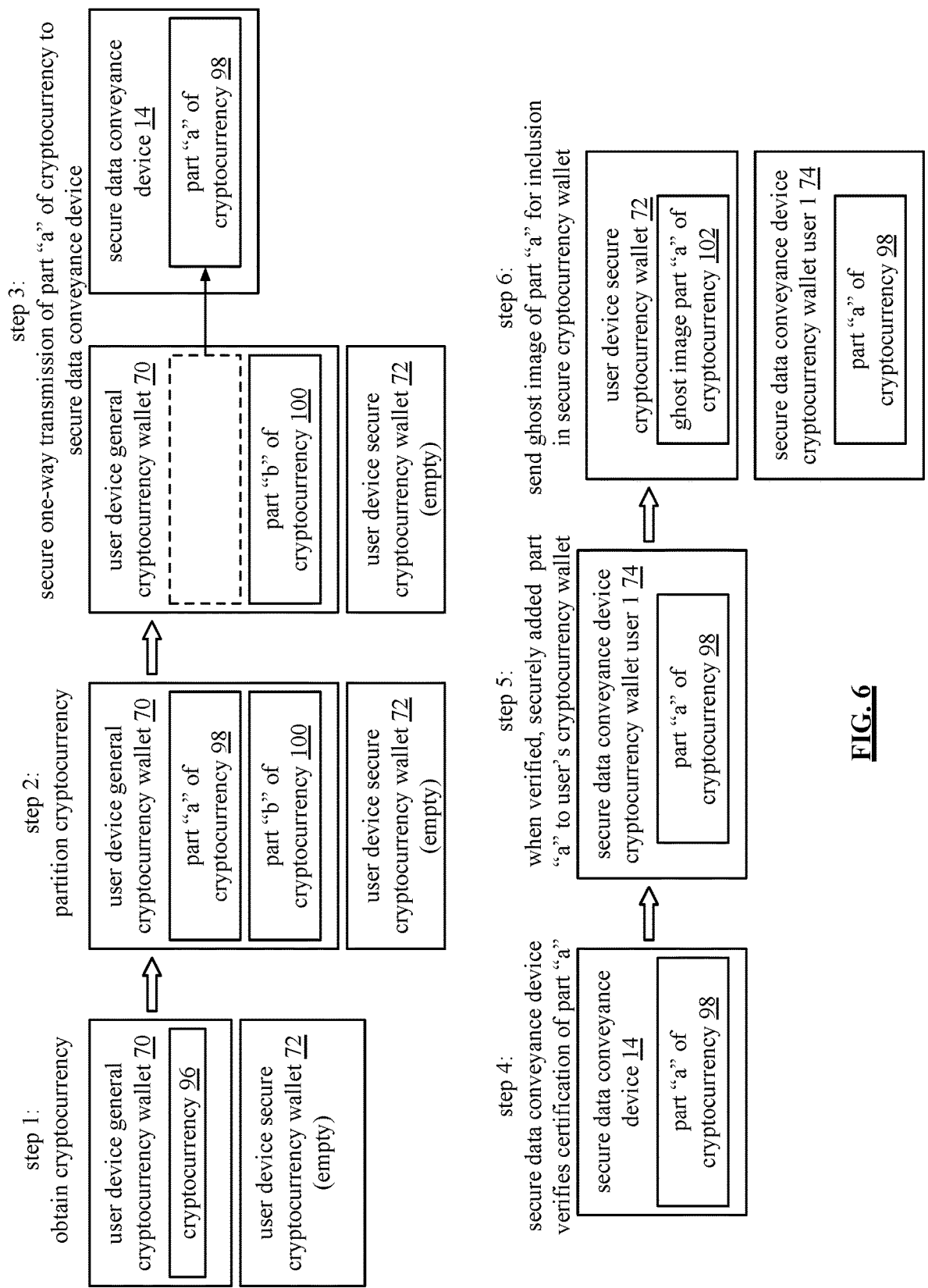
FIG. 6 is a schematic block diagram of another embodiment of user computing device account setup with secure data conveyance device in accordance with the present invention.

FIG. 6 is a schematic block diagram of another embodiment of user computing device setting up an account with secure data conveyance device with reference to the example of FIG. 3. Prior to the steps listed, user computing device 12 obtains application "b" 38 and establishes affiliation 58 with secure data conveyance device 14 (e.g., initiates a user account with secure data conveyance device 14). At step 1, user computing device 12 obtains cryptocurrency 96 where it is stored in user computing device 12's general cryptocurrency wallet 70. User computing device 12's secure cryptocurrency wallet 72 is currently empty. Cryptocurrency is a data object that has been certified via a blockchain. A more detailed discussion of blockchain data storage is discussed with reference to FIG. 7.

At step 2, user computing device 12 partitions the cryptocurrency 96 into parts "a" and "b." Part "a" of cryptocurrency 98 is the amount of cryptocurrency user computing device 12 wishes to convey. Therefore, part "a" of cryptocurrency 98 may be some or all of the cryptocurrency 96 and part "b" of cryptocurrency 100 may be some or none of the cryptocurrency 96.

At step 3, user computing device 12 sends part "a" of cryptocurrency 98 to secure data conveyance device 14 via a secure one-way transmission (e.g., using a blockchain). At step 4, secure data conveyance device 14 verifies certification of part "a" of cryptocurrency 98. When verified, secure data conveyance device 14 securely adds part "a" of cryptocurrency 98 to secure data conveyance device cryptocurrency wallet for user 1 74 at step 5. For example, a blockchain is used to add part "a" of cryptocurrency 98 to cryptocurrency wallet for user 1 74 and part "a" of cryptocurrency 98 is encrypted using a private key of user computing device 12.

At step 6, secure data conveyance device 14 sends a ghost image of part "a" of cryptocurrency 102 to user computing device 12 for storage in secure cryptocurrency wallet 72. As shown, the real data (part "a" of cryptocurrency 98) is stored in secure data conveyance device cryptocurrency wallet for user 1 74 while a representation of the data (the ghost image of "a" of cryptocurrency 102) is stored in user computing device 12's secure cryptocurrency wallet 72. Therefore, user computing device 12 has an image of what is in secure data conveyance device 14 and cannot undo the transfer (e.g., because transactions are secured on a blockchain).

Figure 7:
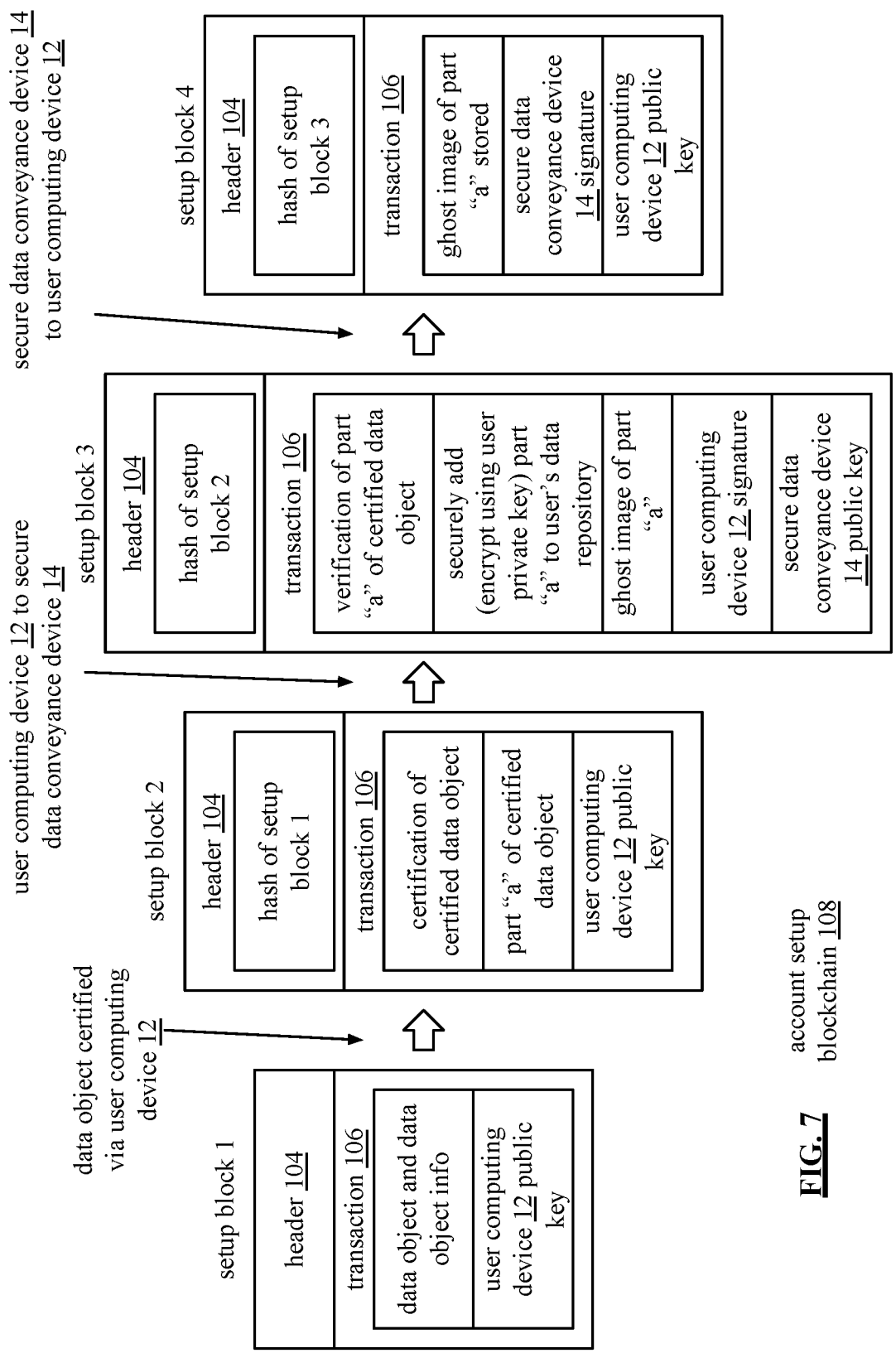
FIG. 7 is a schematic block diagram of a user computing device account setup with secure data conveyance device blockchain in accordance with the present invention.

FIG. 7 is a schematic block diagram of a user computing device setting up an account with secure data conveyance device blockchain 108 ("account setup blockchain 108"). Each participant in account setup blockchain 108 is assigned a private key to make transactions with and once transactions are complete, participants can verify the transactions using public keys. Thus, each transaction is digitally signed (via a combination of private and public keys) to ensure authenticity and that transactions are not tampered with. Each block in the account setup blockchain 108 includes a header section 104 and a transaction section 106. Header section 104 includes one or more of identifying information, a nonce, and a hash of a preceding block when there is a preceding block. Transaction section 106 includes one or more of a public key of the device currently interacting with a blockchain, a signature of a preceding device, one or more transactions and corresponding transaction information (e.g., timestamp, etc.), and data involved in the one or more transactions.

User computing device 12 generates setup block 1 upon initial account set up. Setup block 1 transaction section 106 includes a data object (e.g., that is stored in user computing device's general data repository), data object information (e.g., where the data object was obtained, type of data object, etc.), and user computing device 12' a public key. Setup block 2's header section 104 includes a hash of setup block 1. Setup block 2's transaction section 106 includes transaction information regarding certification of the data object. For example, user computing device 12 encrypts the data object via user computing device's private key and generates a digital signature for the encryption. Setup block 2 transaction section 106 further includes transaction information regarding partitioning the certified data object, part "a" of the certified data object (as a result of the partitioning), and user computing device 12's public key.

User computing device 12 sends setup block 2 to secure data conveyance device 14. Secure data conveyance device 14 generates setup block 3. Setup block 3 header section 104 includes a hash of setup block 2. Setup block 3 transaction section 106 includes transaction information regarding verification of part "a" of the certified data object (e.g., certified data object is verified using user computing device 12's public key), transaction information regarding securely adding part "a" of certified data object to secure data conveyance device data repository for user 1 (e.g., the certified data object is encrypted using user computing device 12's private key), information regarding creating and sending a ghost image of part "a" of certified data object to user computing device for storage, and the ghost image of part "a" of certified data object. Setup block 3 transaction section 106 also includes user computing device 12's signature and secure data conveyance device 14's public key.

Secure data conveyance device 14 sends setup block 3 to user computing device 12. User computing device 12 generates setup block 4. Setup block 4 header section 104 includes a hash of setup block 3. Setup block 4 transaction section 106 includes transaction information regarding storage of the ghost image of part "a" of certified data object in user computing device's secure data repository, secure data conveyance device 14's signature, and user computing device 12's public key. Because data is transferred and stored using a blockchain, the transfer and storage is public and tamper-proof.

Figure 8A:
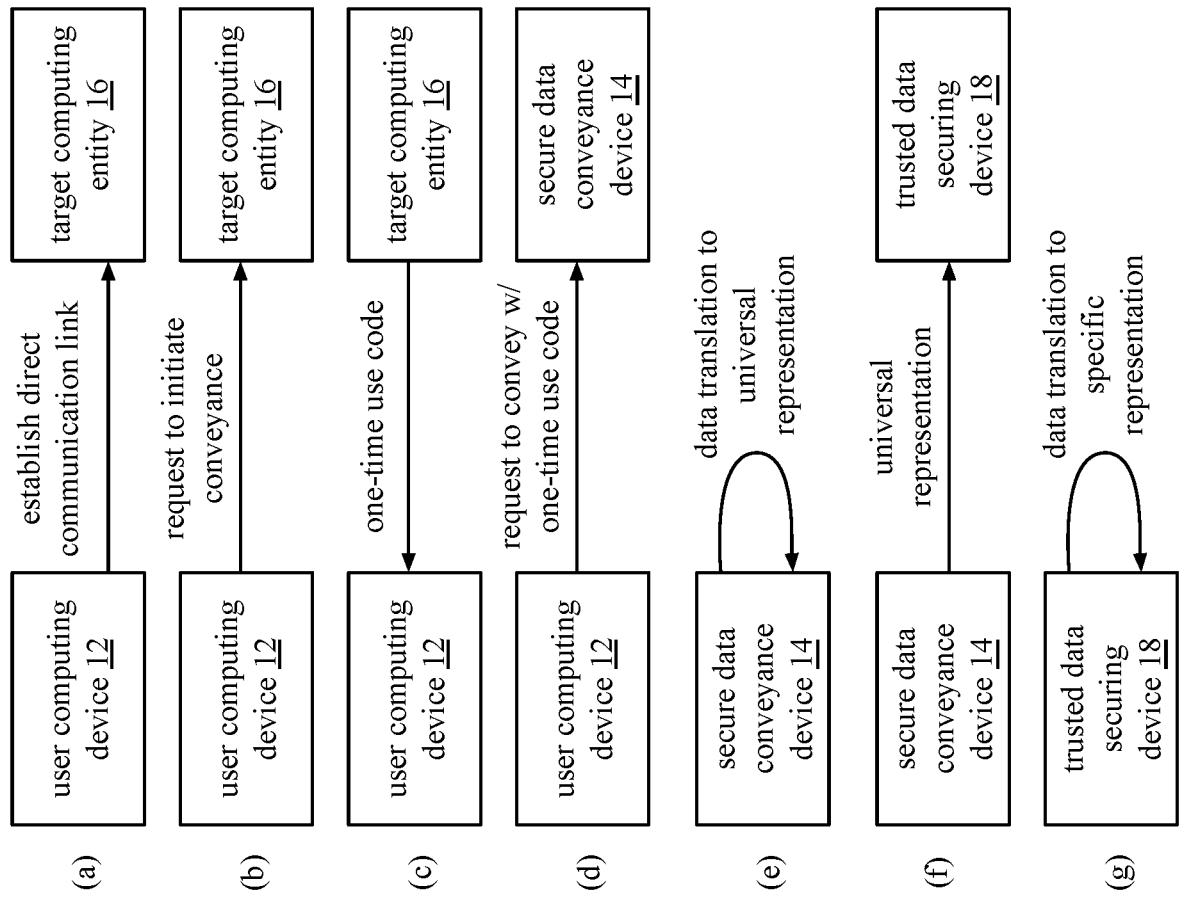
FIGS. 8A-8B are flowcharts of an example of a method of conveying a certified data object in accordance with the present invention.
Figure 8B:
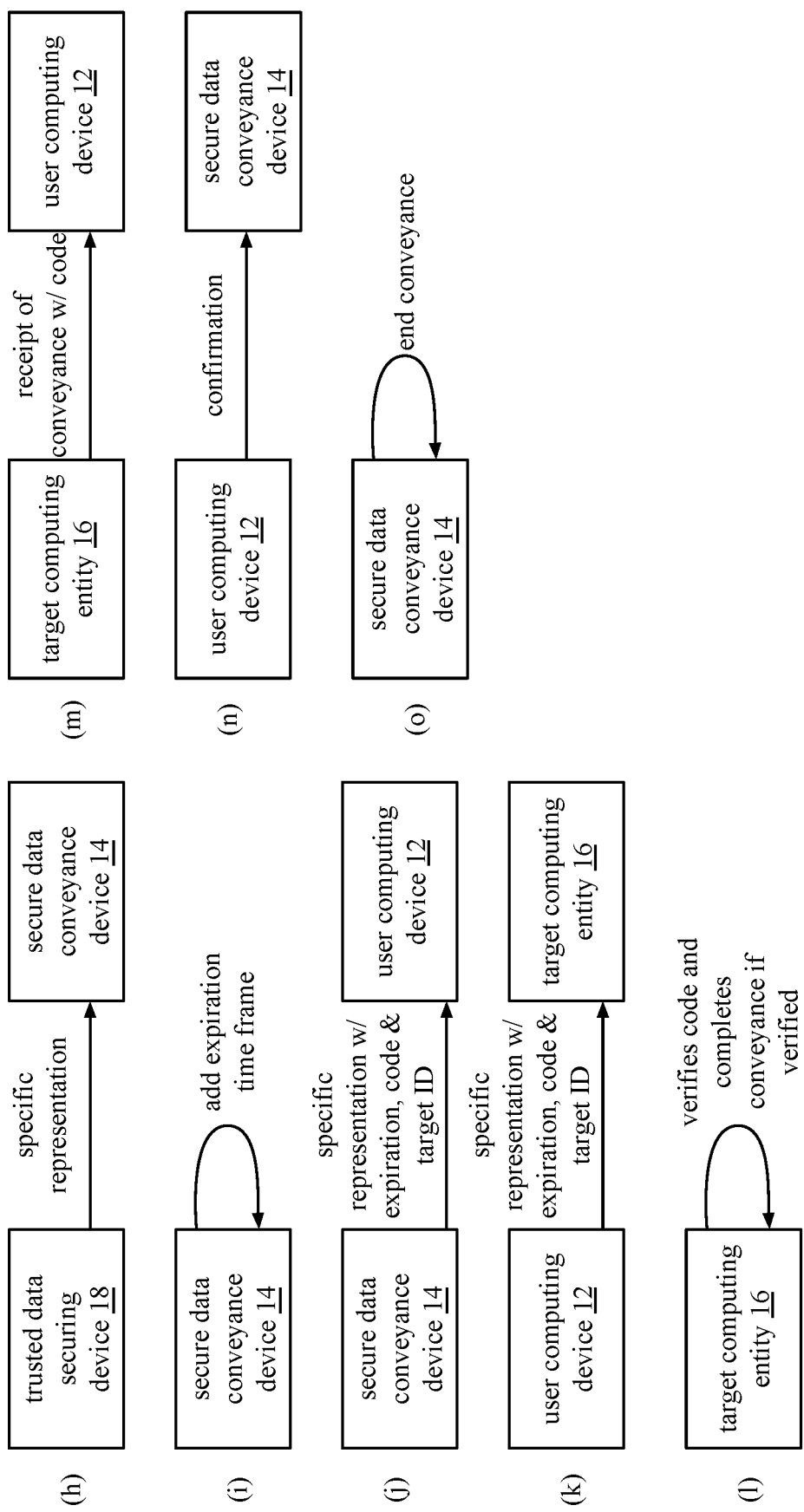

FIGS. 8A-8B are flowcharts of a method of conveying a certified data object with reference to the secure & trusted data communication system of FIG. 1. FIG. 8A begins with step (a) where user computing device 12 establishes a direct communication link with the target computing entity 16 via a direct communication link. For example, the direct communication link is near field communication (NFC) and when user computing device 12 is within range of target computing entity 16 (e.g., within a few feet), user computing device 12 can open a channel or tab to exchange data with target computing entity 16. In one embodiment, the request to initiate conveyance may be in the form of a split bar code, where user computing device 12 maintains one portion of a bar code and target computing entity 16 maintains another portion of a bar code such that when they are aligned in close proximity, the conveyance is initiated.

At step (b), user computing device 12 sends target computing entity 16 a request to initiate conveyance of at least a portion of a certified data object (hereinafter for FIGS. 8A and 8B referred to as the certified data object) to the target computing entity 16 via the direct communication link. When the request to initiate conveyance is approved by the target computing entity 16, target computing entity 16 sends the user computing device 12 a one-time use code (e.g., a transaction ID) regarding conveyance of the certified data object at step (c). For example, the target computing entity 16 approves the request to initiate conveyance when the target computing entity 16 is affiliated with trusted data securing device 18 and is otherwise capable of receiving the conveyance, user computing device 12 is a trusted computing device (e.g., by verification of ID, certificate, etc.), etc.

At step (d), user computing device 12 sends the one-time use code plus a request to convey the certified data object to secure data conveyance device 14. When approved, secure data conveyance device 14 data translates the certified data object from a first data representation to a universal data representation while substantially preserving the meaning of the data object. For example, when the certified data object is cryptocurrency, the first data representation is a specific type of cryptocurrency (e.g., Bitcoin) and the universal data representation is fiat currency. As another example, when the certified data object is a confidential text file, the first data representation is an encrypted text file and the universal data representation is a portable document format (PDF) file. A more detailed discussion of data translation is discussed with reference to FIGS. 11A-11E.

At step (e), secure data conveyance device 14 sends the universal data representation of the certified data object to trusted securing device 18 (e.g., via a secure communication technique). Trusted data securing device 18 has an affiliation with target computing entity 16. For example, target computing entity 16 has an account with trusted data securing device 18. At step (g), trusted securing device 18 translates the universal data representation of the certified data object to a specific data representation. For example, when the certified data object is cryptocurrency, the first data representation is a specific type of cryptocurrency (e.g., Bitcoin), the universal data representation is fiat currency, and the specific data representation is a stored value account (SVA) usable by the target computing entity 16 (e.g., a merchant).

As another example, when the certified data object is a confidential text file, the first data representation is an encrypted text file, the universal data representation is a PDF file, and the specific data representation is a format specific to target computing entity 16 (e.g., Word document, pages, etc.) and includes a conveyance identifier (ID) as a key for decrypting the text file and the transaction ID. A more detailed discussion of data translation is discussed with reference to FIGS. 11A-11E.

The method continues with step (h) on FIG. 8B where the trusted data securing device 18 sends the specific data representation to secure data conveyance device 14 (e.g., via a secure communication technique). At step (i), secure data conveyance device 14 adds an expiration time frame to the specific data representation. For example, secure data conveyance device 14 adds an expiration time frame of 30 seconds for the user to complete the conveyance.

At step (j), secure data conveyance device 14 sends the specific representation with the expiration time frame, code, and the target computing entity identifier (ID) to user computing device 12 (e.g., via a secure communication technique). At step (k), user computing device 12 sends the specific representation with the expiration time frame, a code, and the target computing entity identifier (ID) to target computing entity 16 via the direct communication link (e.g., a split bar code).

At step (l), target computing entity 16 verifies the code and ID and completes the conveyance if verified. Once complete, target computing entity 16 sends user computing device 12 a receipt of the conveyance with a code at step (m). At step (n), user computing device 12 sends a sends a confirmation (e.g., success, failure, time-out) of the conveyance to secure data conveyance device 14. At step (o), secure data conveyance device 14 ends the conveyance. A more detailed discussion of ending the conveyance is discussed with reference to FIGS. 12-13.

Figure 9A:
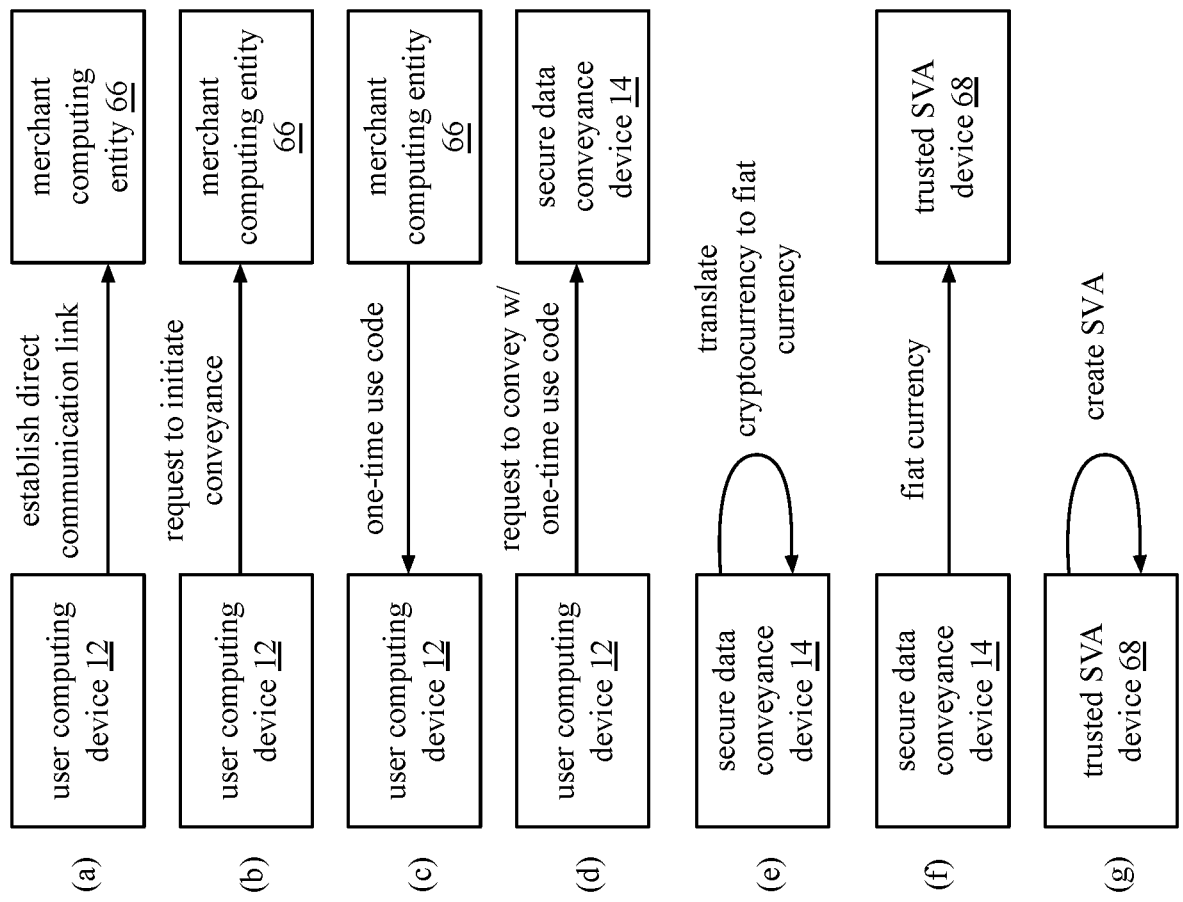
FIGS. 9A-9B are flowcharts of an example of a method of conveying cryptocurrency in accordance with the present invention.
Figure 9B:
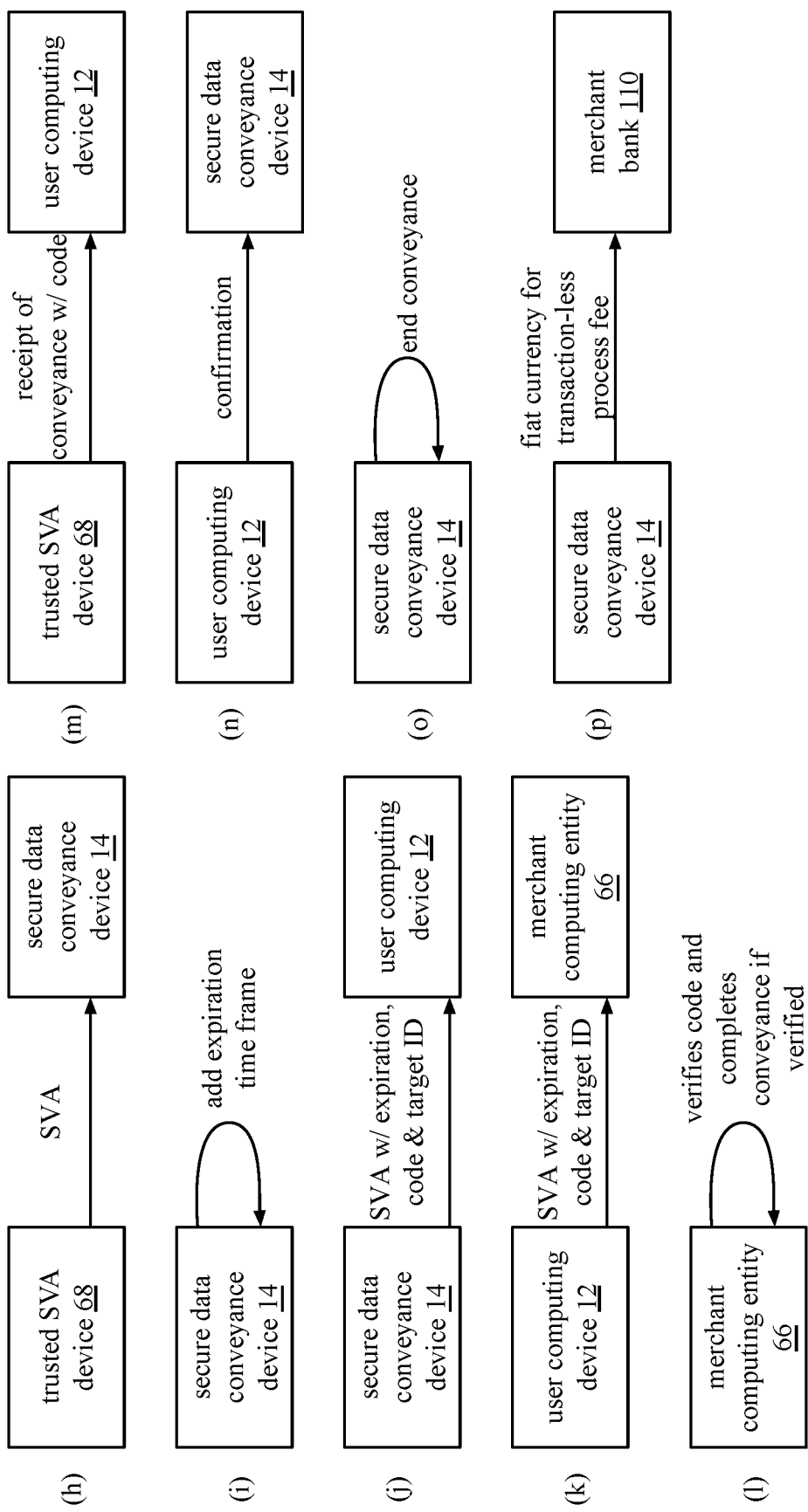

FIGS. 9A-9B are flowcharts of a method of conveying cryptocurrency with reference to the secure & trusted data communication system of FIG. 3. FIG. 9A begins with step (a) where user computing device 12 establishes a direct communication link with merchant computing entity 66.

At step (b), user computing device 12 sends merchant computing entity 66 a request to initiate conveyance of at least a portion of the cryptocurrency to the merchant computing entity 66 via the direct communication link. When the request to initiate conveyance is approved by the merchant computing entity 66, merchant computing entity 66 sends the user computing device 12 a one-time use code regarding conveyance of the at least a portion of the cryptocurrency at step (c).

At step (d), user computing device 12 sends the one-time use code plus a request to convey the at least a portion of the cryptocurrency to secure data conveyance device 14. When approved, secure data conveyance device 14 translates the at least a portion of the cryptocurrency from a specific type of cryptocurrency (e.g., Bitcoin) to fiat currency. At step (e), secure data conveyance device 14 sends the fiat currency to trusted stored value account (SVA) device 68 (e.g., via a secure communication technique). Trusted SVA device 68 has an affiliation with merchant computing entity 66. At step (g), trusted SVA device 68 translates the fiat currency to a stored value account (SVA) for user computing device 12.

The method continues with step (h) on FIG. 9B where the trusted SVA device 68 sends the SVA to secure data conveyance device 14 (e.g., via a secure communication technique). At step (i), secure data conveyance device 14 adds an expiration time frame to the SVA. For example, secure data conveyance device 14 adds an expiration time frame of 30 seconds for the user to complete the conveyance with the SVA.

At step (j), secure data conveyance device 14 sends the SVA with the expiration time frame, code, and the merchant computing entity identifier (ID) to user computing device 12 (e.g., via a secure communication technique). At step (k), user computing device 12 sends the SVA with the expiration time frame, code, and the merchant computing entity identifier (ID) to merchant computing entity 66 via the direct communication link (e.g., a split bar code).

At step (l), merchant computing entity 66 verifies the code and ID and completes the conveyance if verified. Once complete, merchant computing entity 66 sends user computing device 12 a receipt of the conveyance with a code at step (m). At step (n), user computing device 12 sends a confirmation (e.g., success, failure, time-out) of the conveyance to secure data conveyance device 14. At step (o), secure data conveyance device 14 ends the conveyance. A more detailed discussion of ending the conveyance is discussed with reference to FIG. 13. At step (p), secure data conveyance device 14 sends fiat currency for a transaction-less processing fee to the merchant bank 110.

Figure 10:
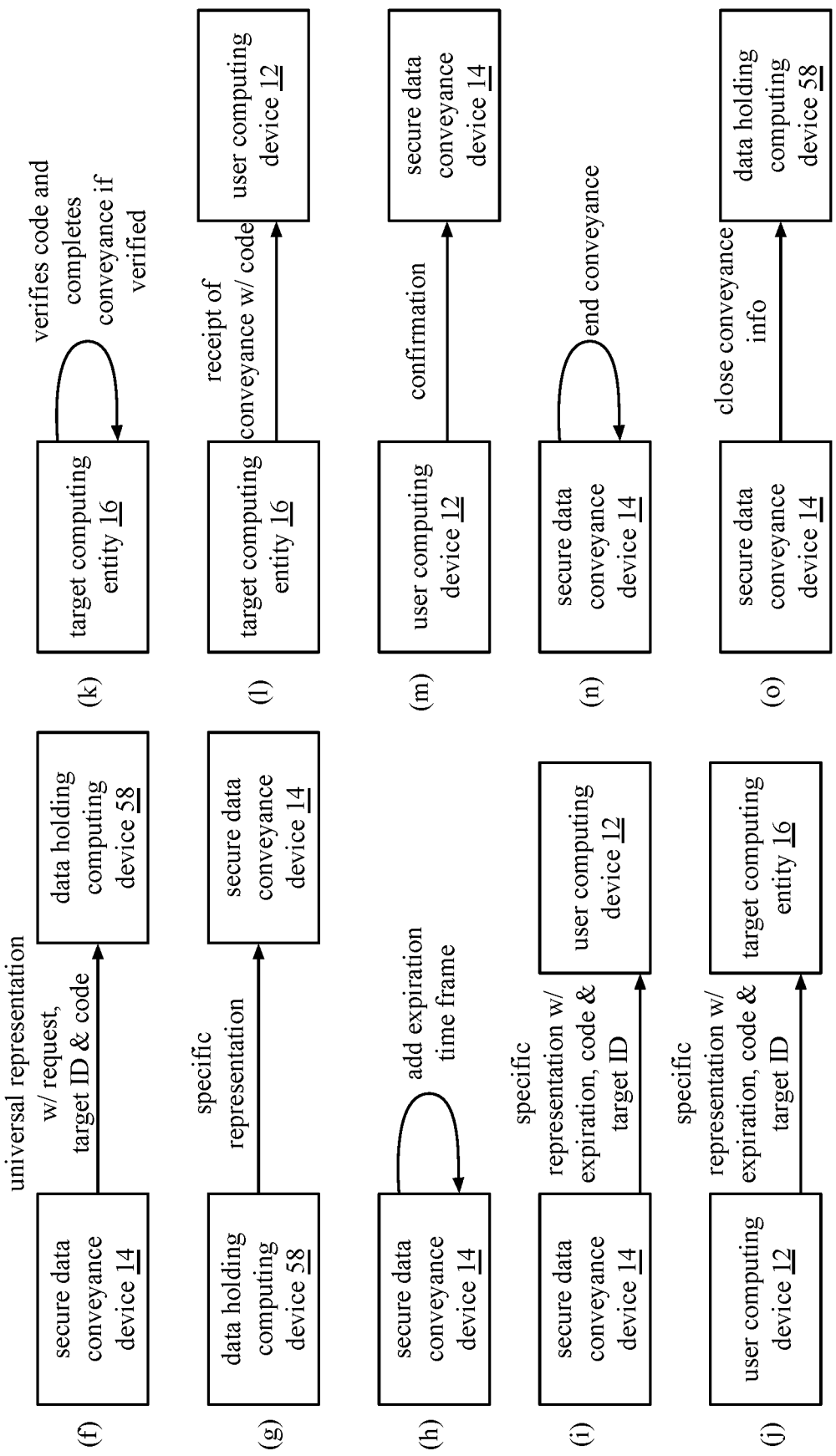
FIG. 10 is a flowchart of another example of a method of conveying a certified data object in accordance with the present invention.

FIG. 10 is a flowchart of another method of conveying a certified data object with reference to the secure & trusted data communication system of FIG. 2. Steps (a)-(e) are the same as discussed with reference to FIG. 8A. At step (f), secure data conveyance device 14 sends the universal representation of the certified data object with a request for a specific representation of the certified data object, the target computing entity's identifier (ID), and the one-time use code to the data holding computing device 58 (e.g., via a secure communication technique). Data holding device 58 has a specific representation of the certified data object stored in data repository for the target. For example, secure data conveyance device 14 sends fiat currency to the data holding computing device 58 with a request for a stored value account (SVA). As another example, secure data conveyance device 14 sends an uncompressed audio file to the data holding computing device 58 with a request for a specific audio format related to the target computing entity (e.g., MP3, WAV, WMA, etc.)

At step (g), data holding device 58 sends the specific representation to secure data conveyance device 14 (e.g., via a secure communication technique). At step (h), secure data conveyance device 14 adds an expiration time frame to the specific data representation. At step (i), secure data conveyance device 14 sends the specific representation with the expiration time frame, code, and the target computing entity identifier (ID) to user computing device 12 (e.g., via a secure communication technique). At step (j), user computing device 12 sends the specific representation with the expiration time frame, code, and the target computing entity identifier (ID) to target computing entity 16 via the direct communication link (e.g., a split bar code).

At step (k), target computing entity 16 verifies the code and ID and completes the conveyance if verified. Once complete, target computing entity 16 sends user computing device 12 a receipt of the conveyance with a code. At step (l), user computing device 12 sends a confirmation (e.g., success, failure, time-out) of the conveyance to secure data conveyance device 14. At step (m), secure data conveyance device 14 ends the conveyance. A more detailed discussion of ending the conveyance is discussed with reference to FIGS. 12-13. At step (o), secure data conveyance device 14 sends close conveyance information to data holding computing device 58 to update the data repository for the target.

Figure 11A:
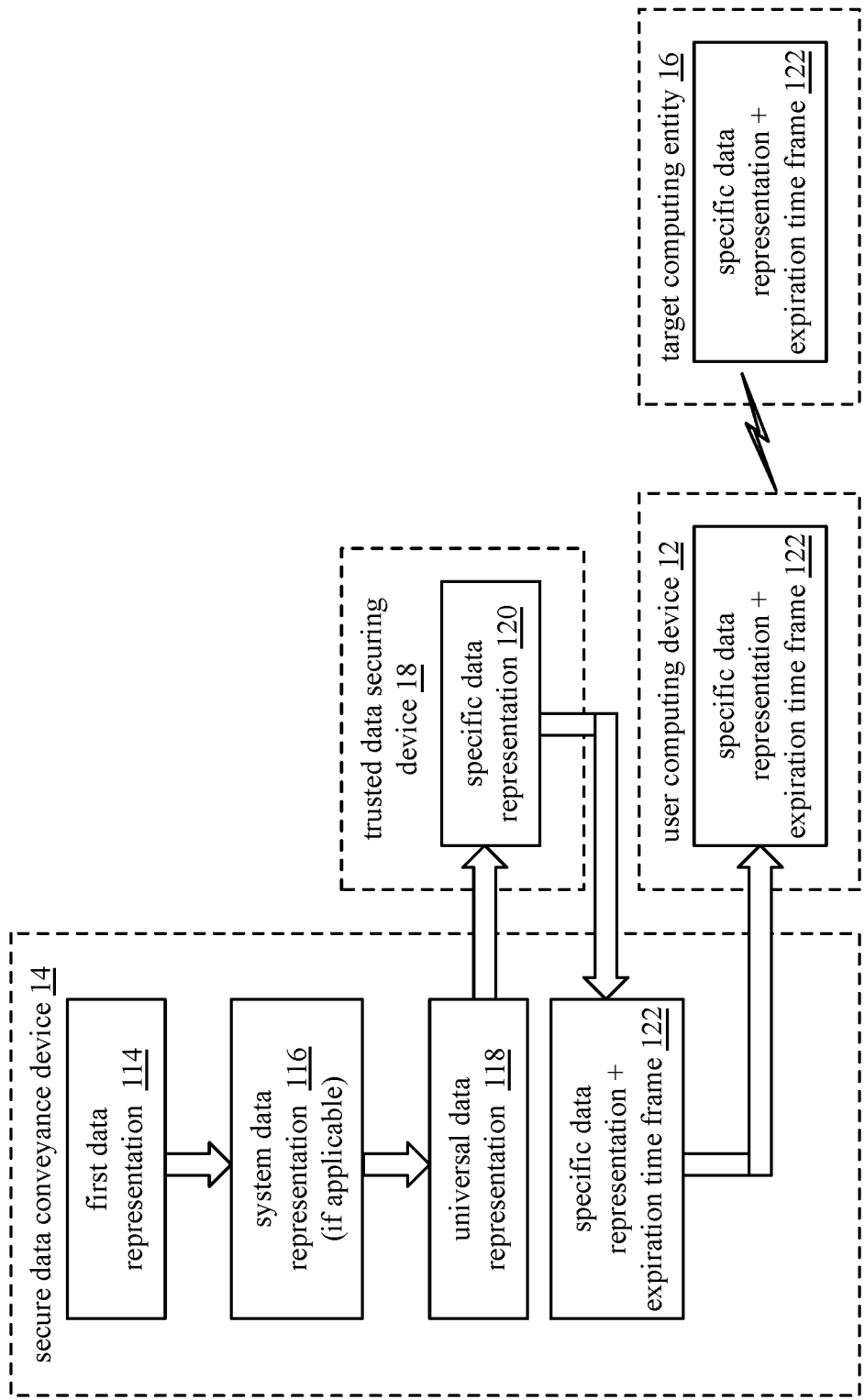
FIGS. 11A-11E are schematic block diagrams of examples of data translation in accordance with the present invention.

FIGS. 11A-11E are schematic block diagrams of examples of data translation. FIG. 11A includes user computing device 12, secure data conveyance device 14, target computing entity 16, and trusted data securing device 18. When a request to convey at least a portion of a certified data object is authenticated, secure data conveyance device 14 translates the at least a portion of the certified data object from a first data representation 114 to a universal data representation 118. Specific examples of first data representation 114 and universal data representation 118 are discussed with reference to FIGS. 11B-11E. If applicable, secure data conveyance device 14 translates the at least a portion of the certified data object from a first data representation 114 to a system data representation 116 prior to translating to the universal data representation 118.

Secure data conveyance device 14 sends the universal data representation 118 of the at least a portion of the certified data object to trusted securing device 18 (e.g., via a secure communication technique). Trusted data securing device 18 data translates the universal data representation of the at least a portion of the certified data object into a specific data representation 120 in accordance with identity of the target computing entity. The specific data representation 120 of the at least a portion of the certified data object substantially preserves the meaning of the at least a portion of the certified data object and is only usable by the target computing entity 16. Specific examples of specific data representation 120 are discussed with reference to FIGS. 11B-11E.

Trusted data securing device 18 sends the specific data representation 120 of the at least a portion of the certified data object to the secure data conveyance device 14 (e.g., via a secure communication technique) where secure data conveyance device 14 adds an expiration time frame to the specific data representation of the at least a portion of the certified data object. Secure data conveyance device 14 sends the specific data representation with the expiration time frame to user computing device 12 (e.g., via a secure communication technique). User computing device 12 conveys, via a direct communication link, the specific data representation of the at least a portion of the certified data object with the expiration time frame 122 to the target computing entity when data conveyance between the user computing device and the target computing entity is confirmed.

Figure 11B:
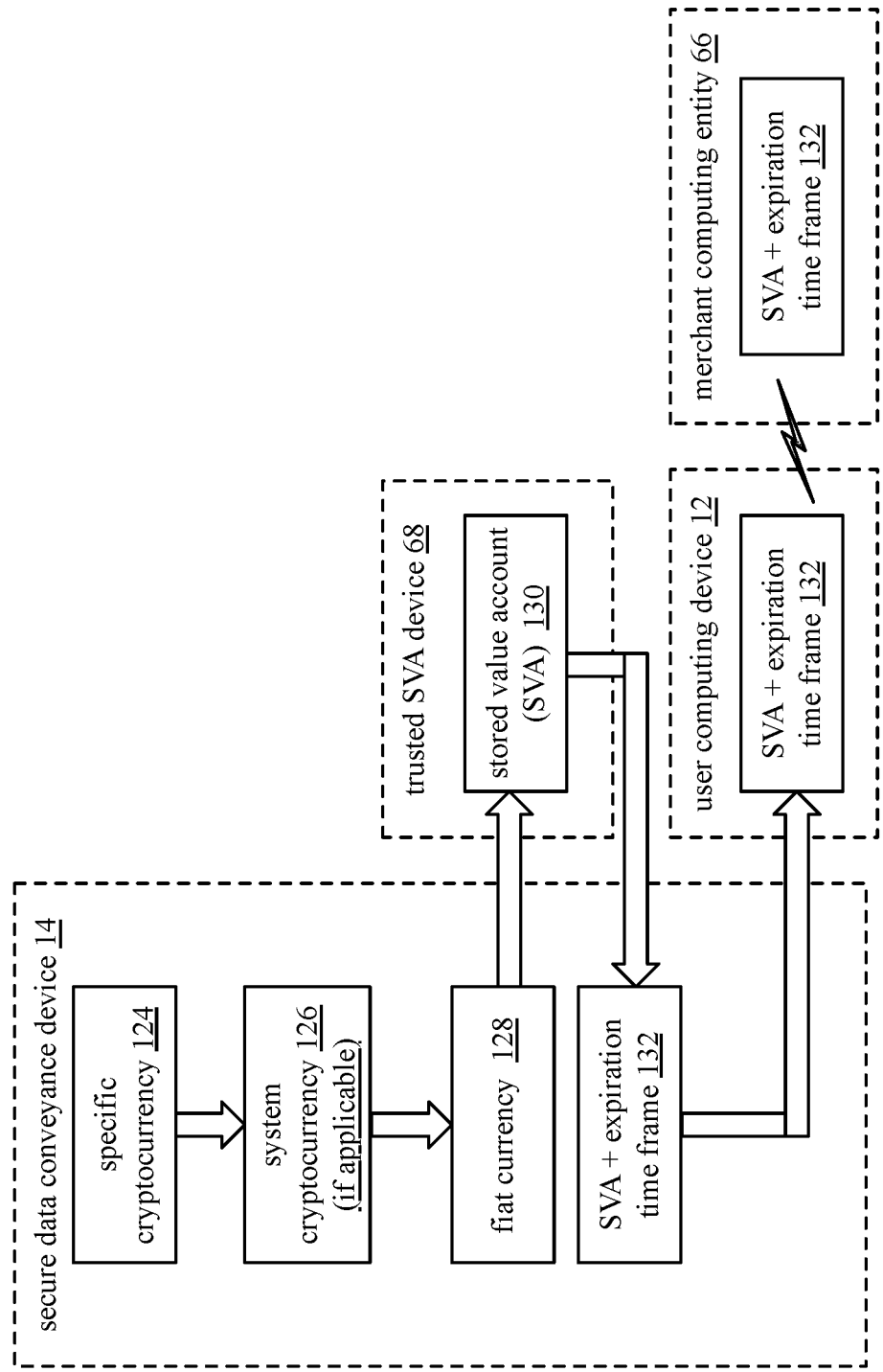

FIG. 11B is a specific example of data translation where the certified data object is cryptocurrency, the target computing entity 16 is a merchant computing entity 66, and the trusted data securing device 18 is a trusted stored value account (SVA) device 68. When a request to convey at least a portion of cryptocurrency is authenticated, secure data conveyance device 14 translates the at least a portion of cryptocurrency from a specific cryptocurrency (e.g., Bitcoin) to fiat currency 128. If applicable, secure data conveyance device 14 translates the at least a portion of the cryptocurrency from a specific cryptocurrency to a system cryptocurrency 126 prior to translating to fiat currency 128.

Secure data conveyance device 14 sends the fiat currency 128 to trusted SVA device 68 (e.g., via a secure communication technique). Trusted SVA device 68 data translates the fiat currency into a stored value account (SVA) 130 in accordance with identity of the merchant computing entity 66. The SVA 130 substantially preserves the meaning of the cryptocurrency and is only usable by the merchant computing entity 66.

Trusted SVA device 68 sends the SVA 130 to the secure data conveyance device 14 (e.g., via a secure communication technique) where secure data conveyance device 14 adds an expiration time frame to the SVA 130. Secure data conveyance device 14 sends the SVA with the expiration time frame 132 to user computing device 12 (e.g., via a secure communication technique). User computing device 12 conveys, via a direct communication link, SVA with the expiration time frame 132 to the merchant computing entity 66 when data conveyance between the user computing device 12 and the merchant computing entity 66 is confirmed.

Figure 11C:
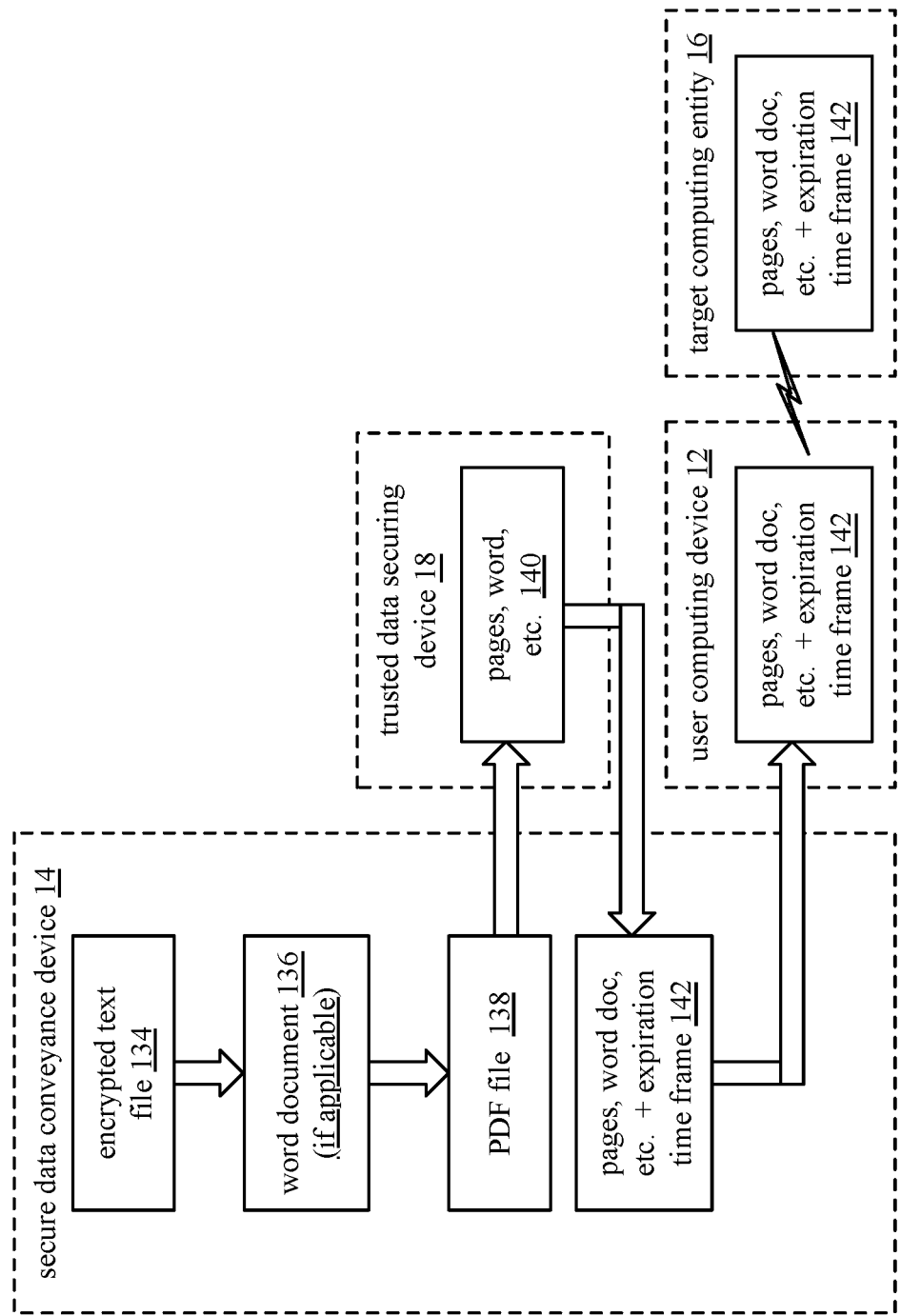

FIG. 11C is a specific example of data translation where the certified data object is a text file (e.g., an encrypted or unencrypted confidential document). FIG. 11C includes user computing device 12, secure data conveyance device 14, target computing entity 16, and trusted data securing device 18. When a request to convey at least a portion of the text file is authenticated, secure data conveyance device 14 translates the at least a portion of the text file from an encrypted text file 134 to a portable document format (PDF) 138. If applicable, secure data conveyance device 14 translates the at least a portion of the text file from encrypted text file 134 to a system data representation such as a specific word processing application (e.g., word document 136) prior to translating to the PDF file 138.

Secure data conveyance device 14 sends the PDF file 138 to trusted data securing device 18 (e.g., via a secure communication technique). Trusted data securing device 18 data translates the PDF file 138 into one of a plurality of text formats specific to the target computing entity (e.g., pages, word document, etc. 140). The text format specific to the target computing entity substantially preserves the meaning of the at least a portion of the text file and is only usable by the target computing entity 16. For example, the text format specific to the target computing entity includes a conveyance identifier (ID) as a key for decrypting the text file, and one or more of the target computing entity and the user computing device created the conveyance ID during an initial set-up of the conveyance of the specific text format to the target computing entity.

Trusted data securing device 18 sends text format specific to the target computing entity to the secure data conveyance device 14 (e.g., via a secure communication technique) where secure data conveyance device 14 adds an expiration time frame to the text format specific to the target computing entity. Secure data conveyance device 14 sends the text format specific to the target computing entity with the expiration time frame 142 to user computing device 12 (e.g., via a secure, communication technique). User computing device 12 conveys, via a direct communication link, the text format specific to the target computing entity with the expiration time frame 142 to the target computing entity 16 when data conveyance between the user computing device 12 and the target computing entity 16 is confirmed.

Figure 11D:
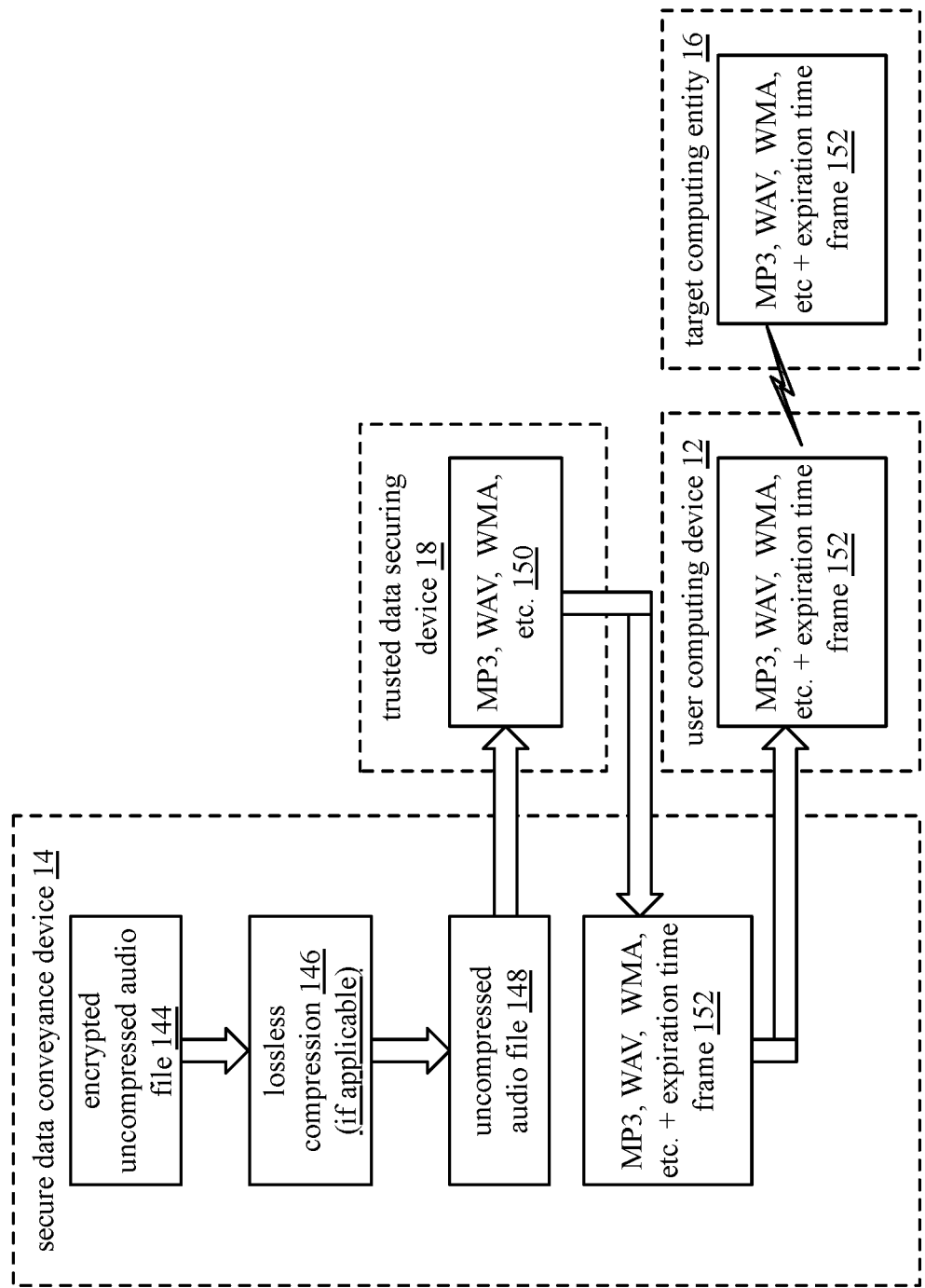

FIG. 11D is a specific example of data translation where the certified data object is an encrypted audio file (e.g., encrypted copyrighted music, etc.). FIG. 11D includes user computing device 12, secure data conveyance device 14, target computing entity 16, and trusted data securing device 18. When a request to convey at least a portion of an encrypted audio file is authenticated, secure data conveyance device 14 translates the at least a portion of the audio file from an encrypted, uncompressed audio file 144 to an uncompressed audio file 148. If applicable, secure data conveyance device 14 translates the at least a portion of the audio file from encrypted, uncompressed audio file 144 to a system data representation such as lossless compression audio file 146 prior to translating to the uncompressed audio file 148.

Secure data conveyance device 14 sends the uncompressed audio file 148 to trusted data securing device 18 (e.g., via a secure communication technique). Trusted data securing device 18 data translates the uncompressed audio file 148 into a specific data representation in accordance with identity of the target computing entity 16 such as MPEG-1 audio layer 3 (MP3), waveform audio (WAV), windows media audio (WMA), etc. 150. The MP3, WAV, WMA, etc. 150 substantially preserves the meaning of the at least a portion of the audio file and is only usable by the target computing entity 16. The specific data representation includes a conveyance identifier (ID) as a key for decrypting the encrypted audio file where one or more of the target computing entity and the user computing device created the conveyance ID during an initial set-up of the conveyance of the specific data representation to the target computing entity.

Trusted data securing device 18 sends the MP3, WAV, WMA, etc. 150 to the secure data conveyance device 14 (e.g., via a secure communication technique) where secure data conveyance device 14 adds an expiration time frame to the MP3, WAV, WMA, etc. 150. Secure data conveyance device 14 sends the MP3, WAV, WMA, etc. with the expiration time frame 152 to user computing device 12. User computing device 12 conveys, via a direct communication link, the MP3, WAV, WMA, etc. with the expiration time frame 152 to the target computing entity 16 when data conveyance between the user computing device 12 and the target computing entity 16 is confirmed.

Figure 11E:
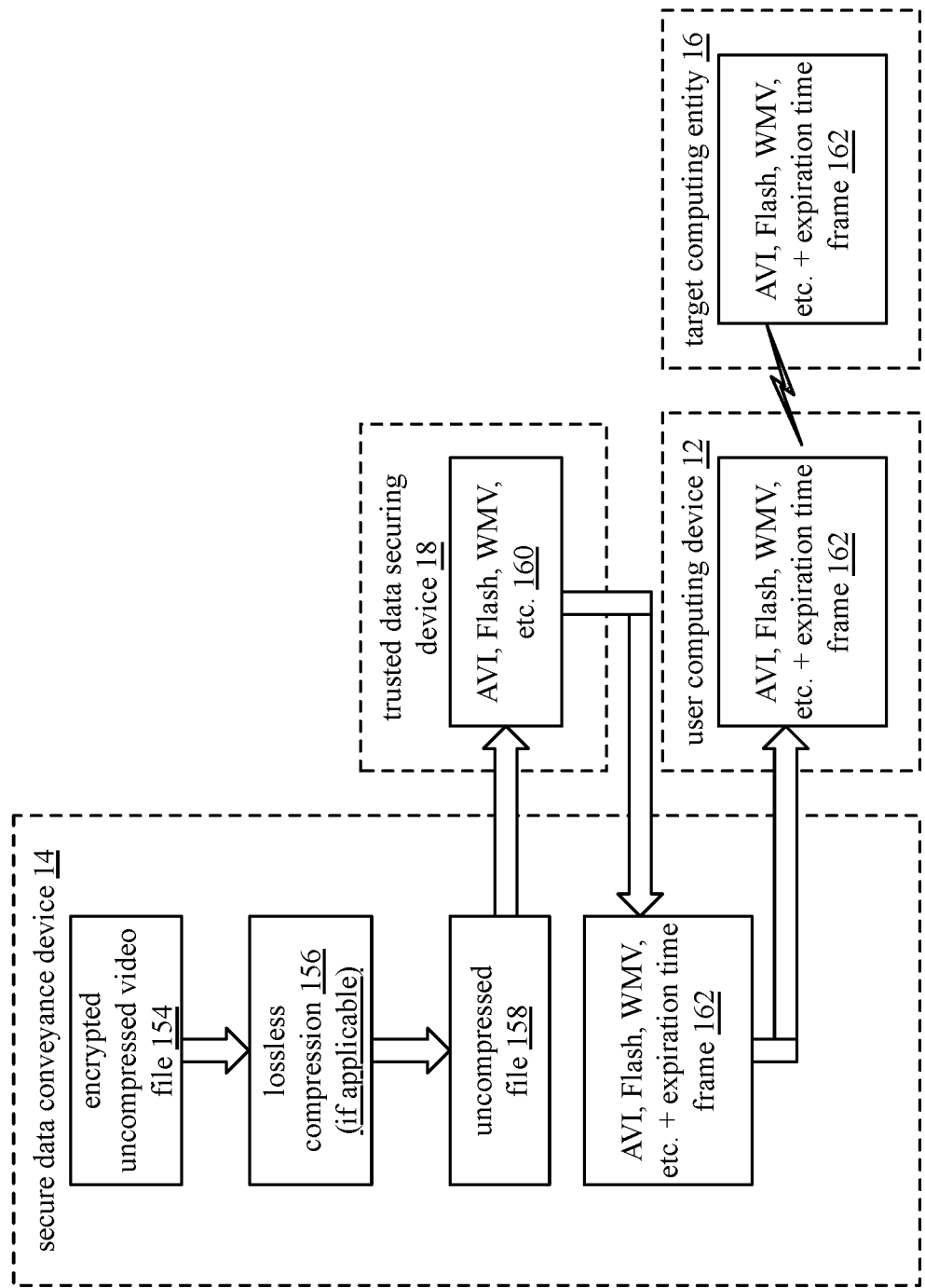

FIG. 11E is a specific example of data translation where the certified data object is an encrypted video file (e.g., copyrighted movie, television show, etc.). FIG. 11E includes user computing device 12, secure data conveyance device 14, target computing entity 16, and trusted data securing device 18. When a request to convey at least a portion of the encrypted video file is authenticated, secure data conveyance device 14 translates the at least a portion of the encrypted video file from an encrypted, uncompressed video file 154 to an uncompressed video file 158. If applicable, secure data conveyance device 14 translates the at least a portion of the encrypted video file from encrypted, uncompressed video file 154 to a system data representation such as lossless compression video file 156 prior to translating to the uncompressed video file 158.

Secure data conveyance device 14 sends the uncompressed video file 158 to trusted data securing device 18 (e.g., via a secure communication technique). Trusted data securing device 18 data translates the uncompressed video file 158 into a specific data representation in accordance with identity of the target computing entity 16 such as audio video interleave (AVI), flash video format, Windows Media Video (WMV), etc. 160. The AVI, flash, WMV, etc. 160 substantially preserves the meaning of the at least a portion of the audio file and is only usable by the target computing entity 16. The specific data representation includes a conveyance identifier (ID) as a key for decrypting the encrypted video file, where one or more of the target computing entity and the user computing device create the conveyance ID during an initial set-up of the conveyance of the specific data representation to the target computing entity.

Trusted data securing device 18 sends the AVI, flash, WMV, etc. 160 to the secure data conveyance device 14 (e.g., via a secure communication technique) where secure data conveyance device 14 adds an expiration time frame to the AVI, flash, WMV, etc. 160. Secure data conveyance device 14 sends the AVI, flash, WMV, etc. with the expiration time frame 162 to user computing device 12 (e.g., via a secure communication technique). User computing device 12 conveys, via a direct communication link, the AVI, flash, WMV, etc. with the expiration time frame 162 to the target computing entity 16 when data conveyance between the user computing device 12 and the target computing entity 16 is confirmed.

Figure 12:
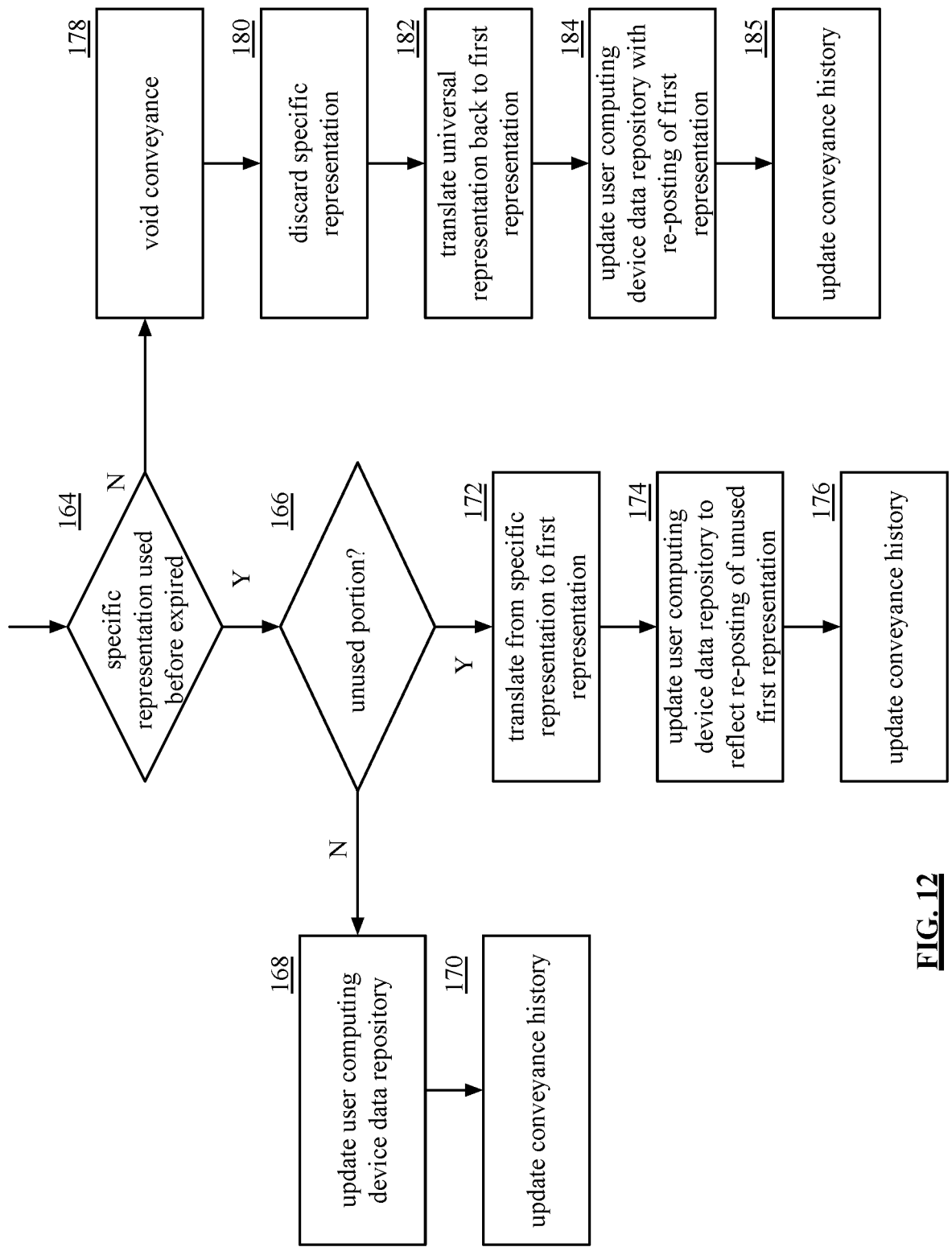
FIG. 12 is a flowchart of an example of a method of ending a conveyance by secure data conveyance device in accordance with the present invention.

FIG. 12 is a flowchart of a method of ending a conveyance by secure data conveyance device. The method begins with step 164 where secure data conveyance device determines whether the specific representation has been used (i.e., properly conveyed from the user computing device to the target computing device) within the expiration time period. If the specific representation has been used within the expiration time period, the method continues with step 166 where the secure data conveyance device determines whether there is an unused portion of the specific representation remaining 166. When there is no unused portion of the specific representation remaining, method continues with step 168 where the secure data conveyance device updates the user computing device data repository to reflect the conveyance. For example, when the certified data object is transferred, it is no longer in the data repository. As such, the secure data conveyance computing device updates the secure data repository of the user computing device to reflect the transfer and may further send the user computing device a message to delete the ghost image of the first representation).

The method continues with step 170 where the secure data conveyance device updates the conveyance history. When there is an unused portion of the specific representation remaining at step 166, method continues with step 172 where the secure data conveyance device data translates the specific representation back to the first representation. For example, the specific representation is a word document and some pages of the word document were conveyed. Secure data conveyance device translates the unconveyed pages of the word document back to the first representation (e.g., an encrypted text file). As another example, not all of an SVA was used in purchasing an item. In this instance, the unused portion of the SVA is converted into fiat currency and then into cryptocurrency.

The method continues with step 174 where the secure data conveyance device updates the user computing device data repository to reflect reposting of unused first representation. Updating the user computing device data repository updates the secure data repository of the user computing device (e.g., the secure data conveyance device sends the user computing device a new ghost image of the re-posted first representation). The method continues with step 176 where the secure data conveyance device updates the conveyance history.

When the specific representation has not been used before expiration of the expiration time frame at step 164, the method continues with step 178 where the secure data conveyance device voids the conveyance. The method continues with step 180 where the secure data conveyance device discards the specific representation. The method continues with step 182 where the secure data conveyance device translates the universal representation of the certified data object back to the first representation. The method continues with step 184 where the secure data conveyance device updates user computing device data repository with re-posting of first representation. Updating the user computing device data repository updates the secure data repository of the user computing device (e.g., the secure data conveyance device sends the user computing device a new ghost image of the re-posted first representation). The method continues with step 185 where the secure data conveyance device updates the conveyance history to reflect a voided conveyance.

Figure 13:
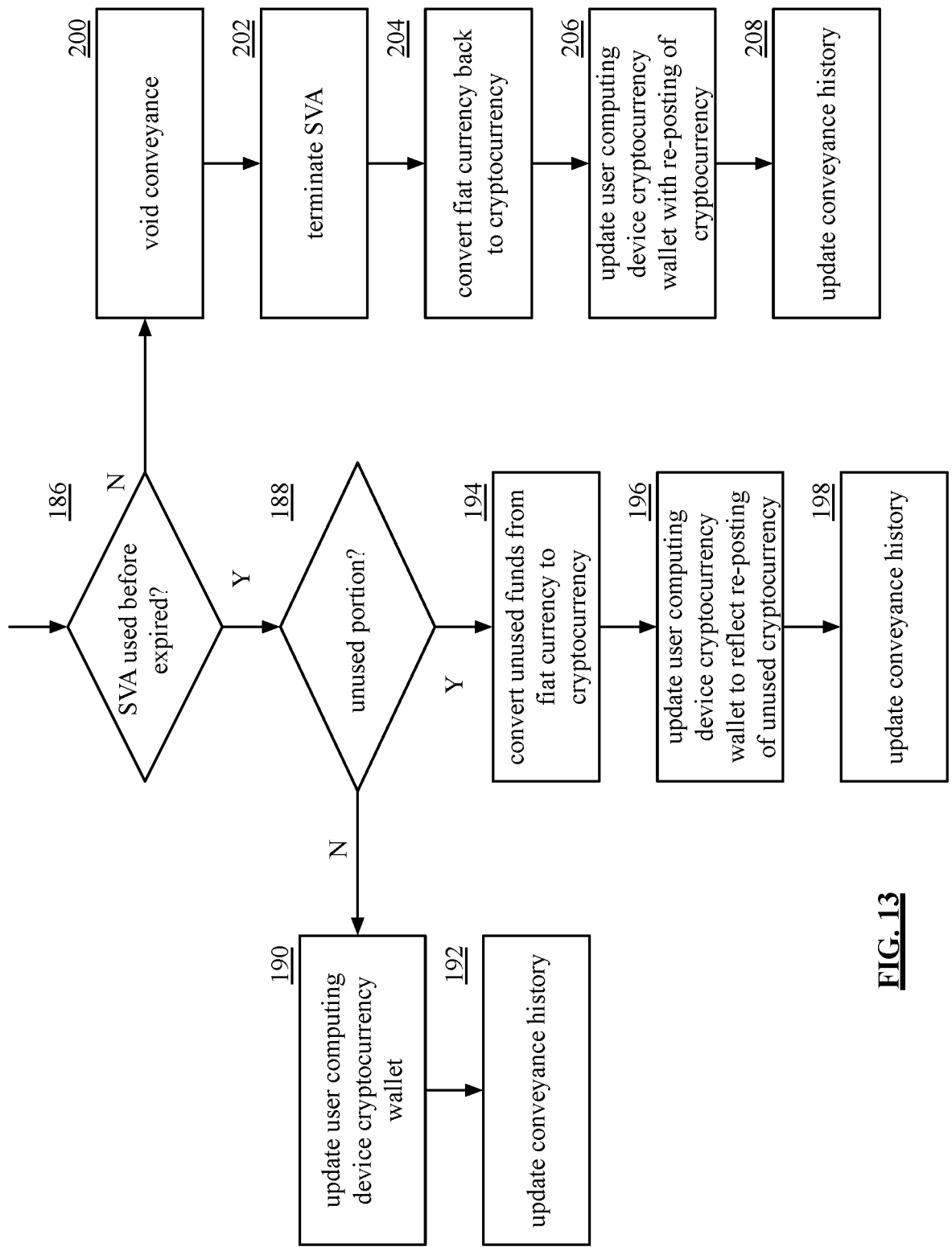
FIG. 13 is a flowchart of another example of a method of ending a conveyance by secure data conveyance device in accordance with the present invention.

FIG. 13 is a flowchart of another method of ending a conveyance by secure data conveyance device. In this example, the certified data object is cryptocurrency, the first representation is a specific cryptocurrency (e.g., Bitcoin), and the specific data representation is a stored value account (SVA). The method begins with step 186 where secure data conveyance device determines whether the SVA has been used within the expiration time period. If the SVA has been used within the expiration time period, the method continues with step 188 where the secure data conveyance device determines whether there is an unused portion of the SVA remaining 188. When there is no unused portion of the SVA remaining, the method continues with step 190 where the secure data conveyance device updates the user computing device cryptocurrency wallet to reflect the conveyance (e.g., the cryptocurrency conveyed is no longer in the cryptocurrency wallet). Updating the user computing device cryptocurrency wallet also updates the secure cryptocurrency wallet of the user computing device (e.g., the secure data conveyance device sends the user computing device a message to delete the ghost image of the cryptocurrency used).

The method continues with step 192 where the secure data conveyance device updates the conveyance history. When there is an unused portion of the SVA remaining at step 186, method continues with step 194 where the secure data conveyance device data translates the unused portion of the SVA back to specific cryptocurrency. The method continues with step 196 where the secure data conveyance device updates the user computing device cryptocurrency wallet to reflect reposting of specific cryptocurrency. Updating the user computing device cryptocurrency wallet, updates the secure cryptocurrency wallet of the user computing device (e.g., the secure data conveyance device sends the user computing device a new ghost image of the re-posted cryptocurrency). The method continues with step 198 where the secure data conveyance device updates the conveyance history.

When the SVA has not been used before expiration of the expiration time frame at step 186, the method continues with step 200 where the secure data conveyance device voids the conveyance. The method continues with step 202 where the secure data conveyance device terminates the SVA. The method continues with step 204 where the secure data conveyance device translates fiat currency back to the specific cryptocurrency. The method continues with step 206 where the secure data conveyance device updates user computing device cryptocurrency wallet with re-posting of the specific cryptocurrency. Updating the user computing device cryptocurrency wallet updates the secure cryptocurrency wallet of the user computing device (e.g., the secure data conveyance device sends the user computing device a new ghost image of the re-posted cryptocurrency). The method continues with step 208 where the secure data conveyance device updates the conveyance history to reflect a voided conveyance.

With reference to one or more of the embodiments and/or examples discussed above, data is securely conveyed within system 10 in a trusted and secure manner while substantially reducing the fraud. With the use of one-way secure transmissions, secure communication techniques, one or more data translations, a transaction identifier, a secure computing device, a trusted data securing device, and/or direct link communication, a user computing device can securely convey data to a target computing device and both devices can trust that the other device is a valid (non-fraudulent) device and is authorized to participate the data conveyance.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for a secure, trusted, and fraud-less data communication of a secure and trusted data communication system, the method comprises:

initiating, by a user computing device of the secure and trusted data communication system via a direct communication link, a conveyance of at least a portion of a certified data object to a target computing entity of the secure and trusted data communication system, wherein the at least the portion of the certified data object is stored by a secure data conveyance device of the secure and trusted data communication system on behalf of the user computing device, wherein the at least the portion of the certified data object is stored in a first data format;

obtaining, by the user computing device, a one-time use code from the target computing entity regarding the conveyance;

receiving, by the secure data conveyance device, a request regarding the conveyance from the user computing device, wherein the request includes the one-time use code, a target computing entity identifier (ID) associated with the target computing entity, and an amount of the portion of the certified data object;

converting, by the secure data conveyance device, the at least the portion of the certified data object from the first data format into a universal data format;

sending, by the secure data conveyance device, the at least the portion of the certified data object in the universal data format to a trusted data securing device of the secure and trusted data communication system, wherein the trusted data securing device is associated with the target computing entity;

converting, by the trusted data securing device, of the at least the portion of the certified data object in the universal data format into a second data format in accordance with the target computing entity ID, wherein the second data format is only usable by the target computing entity;

sending, by the trusted data securing device, the at least the portion of the certified data object in the second data format to the secure data conveyance device;

adding, by the secure data conveyance device, an expiration time frame the at least the portion of the certified data object in the second data format, wherein the expiration time frame sets an expiration time for the conveyance;

forwarding, by the secure data conveyance device, the at least the portion of the certified data object in the second data format with the expiration time frame to the user computing device; and sending, by the user computing device via the direct communication link, the at least the portion of the certified data object in the second data format with the expiration time frame to the target computing entity to complete the conveyance.

2. The method of claim 1, wherein the converting the at least the portion of the certified data object from the first data format into the universal data format further comprises:

converting, by the secure data conveyance device, the at least the portion of the certified data object from the first data format into a system data format; and converting, by the secure data conveyance device, the at least the portion of the certified data object in the system data format into the universal data format.

3. The method of claim 1, wherein the target computing entity includes one or more computing devices of the secure and trusted data communication system having an affiliation with the target computing entity identifier (ID).

4. The method of claim 1, wherein the target computing entity is a merchant computing entity, the at least the portion of the certified data object is a specific amount of cryptocurrency, the first data format is a type of the cryptocurrency, the universal data format is fiat currency, and the second data format is a stored value account (SVA) for the merchant computing entity.

5. The method of claim 1, wherein the at least the portion of the certified data object is a specific amount of an encrypted text file, the first data format is a type of the encrypted text file, the universal data format is a portable document format (PDF), the second data format is one of a plurality of text formats specific to the target computing entity, wherein the specific data format includes a conveyance identifier (ID) as a key for decrypting the encrypted text file, and wherein one or more of the target computing entity and the user computing device create the conveyance ID.

6. The method of claim 1, wherein the at least the portion of the certified data object is a specific amount of an encrypted audio file, the first data format is a type of the encrypted audio file, the universal data format is an uncompressed audio format, the second data format is one of a plurality of audio formats specific to the target computing entity, wherein the specific data format includes a conveyance identifier (ID) as a key for decrypting the encrypted audio file, and wherein one or more of the target computing entity and the user computing device create the conveyance ID.

7. The method of claim 1, wherein the at least the portion of the certified data object is a specific amount of an encrypted video file, the first data format is a type of the encrypted video file, the universal data format is an uncompressed video format, the specific data format is one of a plurality of video formats specific to the target computing entity, wherein the second data format includes a conveyance identifier (ID) as a key for decrypting the encrypted video file, and wherein one or more of the target computing entity and the user computing device create the conveyance ID during an initial set-up of the conveyance of the at least the portion of the certified data object in the specific data format to the target computing entity.

8. A computer readable memory comprises:
a first memory element that stores operational instructions that, when executed by a user computing device of a secure and trusted data communication system, causes the user computing device to:
  initiate, via a direct communication link, a conveyance of at least a portion of a certified data object to a target computing entity of the secure and trusted data communication system, wherein the at least the portion of the certified data object is stored by a secure data conveyance device of the secure and trusted data communication system on behalf of the user computing device, wherein the at least the portion of the certified data object is stored in a first data format;
  obtain a one-time use code from the target computing entity regarding the conveyance;
a second memory element that stores operational instructions that, when executed by the secure data conveyance device of the secure and trusted data communication system, causes the secure data conveyance device to:
  receive a request regarding the conveyance from the user computing device, wherein the request includes the one-time use code, a target computing entity identifier (ID) associated with the target computing entity, and an amount of the portion of the certified data object;
  convert the at least the portion of the certified data object from the first data format into a universal data format;
  send the at least the portion of the certified data object to a trusted data securing device of the secure and trusted data communication system, wherein the trusted data securing device is associated with the target computing entity; and
a third memory element that stores operational instructions that, when executed by the trusted data securing device, causes the trusted data securing device to:
  convert the at least the portion of the certified data object in the universal data format into a second data format in accordance with the target computing entity ID, wherein the second data format is only usable by the target computing entity;
  send the at least the portion of the certified data object in the second data format to the secure data conveyance device; and
a fourth memory element that stores operational instructions that, when executed by the secure data conveyance device, causes the secure data conveyance device to:
  add an expiration time frame to the at least the portion of the certified data object in the second data format, wherein the expiration time frame sets an expiration time for the conveyance;
  forward the at least the portion of the certified data object in the second data format with the expiration time frame to the user computing device; and
a fifth memory element that stores operational instructions that, when executed by the user computing device, causes the user computing device to:
  send, via a direct communication link, the at least the portion of the certified data object in the second data format with the expiration time frame to the target computing entity to complete the conveyance.

9. The computer readable memory of claim 8, wherein the second memory element further stores operational instructions that, when executed by the secure data conveyance device, causes the secure data conveyance device to convert the at least the portion of the certified data object from the first data format into the universal data format by:
  converting, by the secure data conveyance device, the at least the portion of the certified data object from the first data format into a system data format; and
  converting, by the secure data conveyance device, the at least the portion of the certified data object in the system data format into the universal data format.

10. The computer readable memory of claim 8, wherein the target computing entity includes one or more computing devices of the secure and trusted data communication system having an affiliation with the target computing entity identifier (ID).

11. The computer readable memory of claim 8, wherein the target computing entity is a merchant computing entity, the at least the portion of the certified data object is a specific amount of cryptocurrency, the first data format is a type of the cryptocurrency, the universal data format is fiat currency, and the second data format is a stored value account (SVA) for the merchant computing entity.

12. The computer readable memory of claim 8, wherein the at least the portion of the certified data object is a specific amount of an encrypted text file, the first data format is a type of the encrypted text file, the universal data format is a portable document format (PDF), the second data format is one of a plurality of text formats specific to the target computing entity, wherein the specific data format includes a conveyance identifier (ID) as a key for decrypting the encrypted text file, and wherein one or more of the target computing entity and the user computing device create the conveyance ID.

13. The computer readable memory of claim 8, wherein the at least the portion of the certified data object is a specific amount of an encrypted audio file, the first data format is a type of the encrypted audio file, the universal data format is an uncompressed audio format, the second data format is one of a plurality of audio formats specific to the target computing entity, wherein the specific data format includes a conveyance identifier (ID) as a key for decrypting the encrypted audio file, and wherein one or more of the target computing entity and the user computing device create the conveyance ID.

14. The computer readable memory of claim 8, wherein the at least the portion of the certified data object is, a specific amount of an encrypted video file, the first data format is a type of the encrypted video file, the universal data format is an uncompressed video format, the specific data format is one of a plurality of video formats specific to the target computing entity, wherein the second data format includes a conveyance identifier (ID) as a key for decrypting the encrypted video file, and wherein one or more of the target computing entity and the user computing device create the conveyance ID during an initial set-up of the conveyance of the at least the portion of the certified data object in the specific data format to the target computing entity.

* * * * *